US007099678B2

(12) United States Patent
Vaidyanathan

(10) Patent No.: US 7,099,678 B2
(45) Date of Patent: Aug. 29, 2006

(54) SYSTEM AND METHOD FOR TRANSMIT WEIGHT COMPUTATION FOR VECTOR BEAMFORMING RADIO COMMUNICATION

(75) Inventor: Chandra Vaidyanathan, Bethesda, MD (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

(21) Appl. No.: 10/779,268

(22) Filed: Feb. 13, 2004

(65) Prior Publication Data

US 2004/0209579 A1 Oct. 21, 2004

Related U.S. Application Data

(63) Continuation-in-part of application No. 10/627,537, filed on Jul. 25, 2003.
(60) Provisional application No. 60/511,530, filed on Oct. 15, 2003, provisional application No. 60/479,945, filed on Jun. 19, 2003, provisional application No. 60/461,672, filed on Apr. 10, 2003.

(51) Int. Cl.
*H04B 1/00* (2006.01)
*H04B 7/00* (2006.01)
(52) U.S. Cl. .................. 455/500; 455/69; 455/101; 455/132; 375/146; 375/267; 375/299; 375/152
(58) Field of Classification Search ............. 455/67.11, 455/59, 69, 70, 101, 103, 500, 517, 562.1, 455/575.7, 506, 507, 65, 132; 375/299, 347, 375/143, 146, 147, 152, 267
See application file for complete search history.

(56) References Cited

U.S. PATENT DOCUMENTS

| | | | |
|---|---|---|---|
| 4,121,221 A | 10/1978 | Meadows | |
| 4,599,734 A | 7/1986 | Yamamoto | 375/40 |
| 4,639,914 A | 1/1987 | Winters | 370/110.1 |
| 5,274,844 A | 12/1993 | Harrison et al. | 455/25 |
| 5,394,435 A | 2/1995 | Weerackody | 375/206 |
| 5,437,055 A | 7/1995 | Wheatley, III | 455/33.3 |
| 5,457,808 A | 10/1995 | Osawa et al. | |
| 5,491,723 A | 2/1996 | Diepstraten | 375/267 |
| 5,493,307 A | 2/1996 | Tsujimoto | |
| 5,507,035 A | 4/1996 | Bantz et al. | 455/133 |

(Continued)

FOREIGN PATENT DOCUMENTS

WO 01/45300 6/2001

(Continued)

OTHER PUBLICATIONS

Iserte, Antonio Pascual et al., "Pre-and Post-Beamforming in MIMO Channels Applied to HIPERLAN/2 and OFDM," IST Summit 2001 (IST Mobile Communications Summit), Sep. 2001.

(Continued)

*Primary Examiner*—Simon Nguyen
(74) *Attorney, Agent, or Firm*—Volpe and Koenig, P.C.

(57) ABSTRACT

A system and method for vector wireless radio communication (multiple modes or signal streams) between a first communication device and a second communication device using radio frequency (RF) communication techniques. At each communication device, signals are received at a plurality of antennas representing a plurality of modes simultaneously transmitted by the other communication device, wherein each mode is a signal stream. A transmit matrix is computed from signals received at the plurality of antennas. The transmit matrix distributes a plurality of modes among a plurality of antenna paths each associated with a corresponding one of the plurality of antennas of the first communication device, and is applied to the plurality of modes to be simultaneously transmitted from the plurality of antennas of one communication device to the other communication device.

54 Claims, 10 Drawing Sheets

U.S. PATENT DOCUMENTS

| | | |
|---|---|---|
| 5,539,832 A | 7/1996 | Weinstein et al. ............ 381/94 |
| 5,570,366 A | 10/1996 | Baker et al. |
| 5,577,265 A | 11/1996 | Wheatley, III |
| 5,610,617 A | 3/1997 | Gans et al. |
| 5,752,173 A | 5/1998 | Tsujimoto et al. |
| 5,761,193 A | 6/1998 | Derango et al. |
| 5,761,237 A | 6/1998 | Petersen et al. |
| 5,812,531 A | 9/1998 | Cheung et al. |
| 5,848,105 A | 12/1998 | Gardner et al. |
| 5,898,679 A | 4/1999 | Brederveld et al. |
| 5,912,921 A | 6/1999 | Warren et al. |
| 5,930,248 A | 7/1999 | Langlet et al. |
| 5,982,327 A | 11/1999 | Vook et al. ................. 342/380 |
| 6,008,760 A | 12/1999 | Shattil ....................... 342/378 |
| 6,023,625 A | 2/2000 | Myers, Jr. |
| 6,037,898 A | 3/2000 | Parish et al. ................ 342/174 |
| 6,038,272 A | 3/2000 | Golden |
| 6,044,120 A | 3/2000 | Bar-David et al. |
| 6,058,105 A | 5/2000 | Hochwald et al. .......... 370/310 |
| 6,091,934 A | 7/2000 | Berman et al. |
| 6,097,771 A | 8/2000 | Foschini ..................... 375/346 |
| 6,118,788 A | 9/2000 | Kermani |
| 6,122,260 A | 9/2000 | Liu et al. .................... 370/280 |
| 6,124,824 A | 9/2000 | Xu et al. ..................... 342/174 |
| 6,141,393 A | 10/2000 | Thomas et al. ............. 375/347 |
| 6,141,567 A | 10/2000 | Youssefmir et al. |
| 6,144,651 A | 11/2000 | Rinchiuso et al. |
| 6,144,711 A | 11/2000 | Raleigh et al. ............. 375/347 |
| 6,147,985 A | 11/2000 | Bar-David et al. |
| 6,157,340 A | 12/2000 | Xu et al. ..................... 342/174 |
| 6,157,843 A | 12/2000 | Derango et al. |
| 6,177,906 B1 | 1/2001 | Petrus ........................ 342/378 |
| 6,185,440 B1 | 2/2001 | Barratt et al. |
| 6,195,045 B1 | 2/2001 | Xu et al. ..................... 342/368 |
| 6,211,671 B1 | 4/2001 | Shattil |
| 6,252,548 B1 | 6/2001 | Jeon ........................... 342/383 |
| 6,252,884 B1 | 6/2001 | Hunter |
| 6,266,528 B1 | 7/2001 | Farzaneh |
| 6,295,026 B1 | 9/2001 | Chen et al. |
| 6,298,092 B1 | 10/2001 | Heath, Jr. et al. ........... 375/267 |
| 6,307,882 B1 | 10/2001 | Marzetta |
| 6,314,147 B1 | 11/2001 | Liang et al. ................ 375/346 |
| 6,317,466 B1 | 11/2001 | Foschini et al. ............ 375/267 |
| 6,327,310 B1 | 12/2001 | Hochwald et al. .......... 375/259 |
| 6,331,837 B1 | 12/2001 | Shattil ........................ 342/378 |
| 6,349,219 B1 | 2/2002 | Hochwald et al. |
| 6,351,499 B1 | 2/2002 | Paulraj et al. ............... 375/267 |
| 6,362,781 B1 | 3/2002 | Thomas et al. ............. 342/383 |
| 6,369,758 B1 | 4/2002 | Zhang ........................ 342/383 |
| 6,370,182 B1 | 4/2002 | Bierly et al. |
| 6,377,631 B1 | 4/2002 | Raleigh ...................... 375/299 |
| 6,377,636 B1 | 4/2002 | Paulraj et al. |
| 6,377,819 B1 | 4/2002 | Gesbert et al. ............. 455/562 |
| 6,400,699 B1 | 6/2002 | Airy et al. .................. 370/329 |
| 6,400,780 B1 | 6/2002 | Rashid-Farrokhi et al. . 375/347 |
| 6,442,214 B1 | 8/2002 | Boleskei et al. ............ 375/299 |
| 6,452,964 B1 | 9/2002 | Yoshida |
| 6,462,709 B1 | 10/2002 | Choi |
| 6,463,295 B1 | 10/2002 | Yun |
| 6,473,467 B1 | 10/2002 | Wallace et al. ............. 375/267 |
| 6,522,898 B1 | 2/2003 | Kohno et al. |
| 6,549,786 B1 | 4/2003 | Cheung |
| 6,570,929 B1 | 5/2003 | Eriksson |
| 6,584,161 B1 | 6/2003 | Hottinen |
| 6,636,568 B1 | 10/2003 | Kadous ....................... 375/255 |
| 6,646,600 B1 | 11/2003 | Vail et al. |
| 6,684,064 B1 | 1/2004 | Kazakevich et al. |
| 6,687,492 B1 | 2/2004 | Sugar et al. ............. 455/276.1 |
| 6,771,706 B1 | 8/2004 | Ling et al. |
| 2001/0012764 A1 | 8/2001 | Edwards et al. |
| 2001/0015994 A1 | 8/2001 | Nam .......................... 375/130 |
| 2001/0015999 A1 | 8/2001 | Nam .......................... 375/148 |
| 2001/0046255 A1 | 11/2001 | Shattil ........................ 375/142 |
| 2001/0053143 A1 | 12/2001 | Li et al. ...................... 370/344 |
| 2002/0001316 A1 | 1/2002 | Hornsby et al. ............ 370/487 |
| 2002/0024975 A1 | 2/2002 | Hendler |
| 2002/0034191 A1 | 3/2002 | Shattil |
| 2002/0039884 A1 | 4/2002 | Raynes et al. .............. 455/13.3 |
| 2002/0064246 A1 | 5/2002 | Kelkar et al. ............... 375/347 |
| 2002/0067309 A1 | 6/2002 | Baker et al. ................ 342/367 |
| 2002/0072392 A1 | 6/2002 | Awater et al. .............. 455/561 |
| 2002/0085643 A1 | 7/2002 | Kitchener et al. .......... 375/267 |
| 2002/0102950 A1 | 8/2002 | Gore et al. |
| 2002/0111142 A1 | 8/2002 | Klimovitch |
| 2002/0118781 A1 | 8/2002 | Thomas et al. ............. 375/347 |
| 2002/0122383 A1 | 9/2002 | Wu et al. .................... 370/210 |
| 2002/0122501 A1 | 9/2002 | Awater ....................... 375/262 |
| 2002/0127978 A1 | 9/2002 | Khatri ........................ 455/103 |
| 2002/0136170 A1 | 9/2002 | Struhsaker .................. 370/280 |
| 2002/0141355 A1 | 10/2002 | Struhsaker et al. ......... 370/280 |
| 2002/0147032 A1 | 10/2002 | Yoon et al. |
| 2002/0158801 A1 | 10/2002 | Crilly, Jr. et al. |
| 2002/0159537 A1 | 10/2002 | Crilly, Jr. |
| 2002/0172186 A1 | 11/2002 | Larsson |
| 2002/0172269 A1 | 11/2002 | Xu |
| 2002/0191535 A1 | 12/2002 | Sugiyama et al. |
| 2002/0196842 A1 | 12/2002 | Onggosanusi et al. ...... 375/148 |
| 2003/0002450 A1 | 1/2003 | Jalali et al. ................. 370/294 |
| 2003/0003880 A1* | 1/2003 | Ling et al. .................... 455/92 |
| 2003/0022693 A1 | 1/2003 | Gerogiokas et al. |
| 2003/0032423 A1 | 2/2003 | Boros et al. ................ 455/423 |
| 2003/0043929 A1 | 3/2003 | Sampath |
| 2003/0048761 A1 | 3/2003 | Jarett |
| 2003/0072379 A1 | 4/2003 | Ketchum |
| 2003/0072382 A1* | 4/2003 | Raleigh et al. ............. 375/267 |
| 2003/0108117 A1 | 6/2003 | Ketchum et al. ........... 375/295 |
| 2003/0114108 A1 | 6/2003 | Frecassetti et al. |
| 2003/0125040 A1 | 7/2003 | Walton et al. |
| 2003/0125090 A1 | 7/2003 | Zeira ......................... 455/562 |
| 2003/0130012 A1* | 7/2003 | Brunner et al. ............. 455/562 |
| 2003/0139194 A1 | 7/2003 | Onggosanusi et al. ...... 455/506 |
| 2003/0161282 A1 | 8/2003 | Medvedev et al. |
| 2003/0162566 A1* | 8/2003 | Shapira et al. .............. 455/561 |
| 2003/0165189 A1* | 9/2003 | Kadous ....................... 375/225 |
| 2003/0171171 A1* | 9/2003 | Sim et al. ................... 455/101 |
| 2003/0181165 A1 | 9/2003 | Sugar et al. |
| 2003/0181171 A1 | 9/2003 | Sim et al. |
| 2003/0185309 A1* | 10/2003 | Paultler et al. ............. 375/257 |
| 2003/0190897 A1 | 10/2003 | Lei et al. |
| 2003/0218973 A1* | 11/2003 | Oprea et al. ................ 370/210 |
| 2004/0002364 A1* | 1/2004 | Trikkonen et al. ....... 455/562.1 |
| 2004/0013212 A1 | 1/2004 | Benesty et al. |
| 2004/0023621 A1 | 2/2004 | Sugar et al. ................ 455/103 |
| 2004/0048584 A1 | 3/2004 | Vaidyanathan et al. ..... 455/103 |
| 2004/0067775 A1* | 4/2004 | Dalal et al. .............. 455/562.1 |
| 2004/0072546 A1 | 4/2004 | Sugar et al. ............. 455/127.1 |
| 2004/0087308 A1* | 5/2004 | Trikkonen et al. .......... 455/445 |
| 2004/0095907 A1 | 5/2004 | Agee et al. |
| 2004/0171385 A1* | 9/2004 | Haustein et al. ............ 455/450 |
| 2004/0184398 A1* | 9/2004 | Walton et al. .............. 370/203 |

FOREIGN PATENT DOCUMENTS

| WO | 02/03568 | 1/2002 |
|---|---|---|
| WO | WO 02/03568 | 1/2002 |
| WO | WO 01/45300 | 6/2002 |

OTHER PUBLICATIONS

Iserte, Antonio Pascual et al., "Joint Beamforming Strategies in OFDM-MIMO Systems," ICASSP 2002 (IEEE International Conference on Acoustics, Speech and Signal Processing), May, 2002.

Lee, Dennis et al., "Antenna Diversity for an OFDM System in a Fading Channel," Proceedings of IEEE MILCOM 1999, Nov. 1999, pp. 1104-1109.

Jakes, William C., "Microwave Mobile Communications," Copyright 1974, pp. 313-320 and 489-498.
Yeh, Y.S., "An Analysis of Adaptive Retransmission Arrays in a Fading Environment," The Bell System Technical Journal, Oct. 1970, pp. 1811-1825.
Morgan, Samuel P., "Interaction of Adaptive Antenna Arrays in an Arbitrary Environment," The Bell System Technical Journal, Jan. 1965, p. 23-47.
Aziz, Abdul M.k. et al., "Indoor Throughput and Range Improvements using Standard Compliant AP Antenna Diversity in IEEE 802.11a and ETSI HIPERLAN/," Vehicular Technology Conference, 2002, VTC 2001, Oct. 7-11, 2001, IEEE VTS 54th, vol. 4, pp. 2294-2298.
Iserte, Antonio Pascual et al., "Iterative Algorithm for the Estimation of Distributed Sources Localization Parameters," SSP 2001 (11th IEEE Workshop on Statistical Signal Processing), Aug. 2001.
Vaidyanathan et al., "The Role of Lossless Systems in Modern Digital Signal Processing: A Tutorial," IEEE Transactions on Education, vol. 32, Aug. 1989, pp. 181-197.
Raleigh et al., " Spatio-Temporal Coding for Wireless Communication," IEEE Transactions on Communications, vol. 46., No. 3, Mar. 1998, pp. 357-366.
Jungnickel et al., "Performance of a MIMO System with Overlay Pilots," IEEE GlobeCom 2001, pp. 594-598.
BLAST High-Level Overview, Lucent Technologies, Jul. 18, 2000.
Golden et al., "Detection Algorithm and Initial Laboratory Results Using V-Blast Space-Time Communication Architecture," Electronic Letters, Jan. 7, 1999, vol. 35, No. 1.
Golden et al., "V-BLAST: A High Capacity Space-Time Architecture for the Rich-Scattering Wireless Channel," Bell Laboratories, Lucent Technologies, Proc. Int'l Symposium on Advanced Radio Technologies, Builder, CO, Sep. 10, 1998.
Wolniansky et al., "V-BLAST: An Architecture for Realizing Very High Data Rates Over the Rich-Scattering Wireless Channel," Proc. ISSSE-98, Pisa, Italy, Sep. 29, 1998.
Chizhik et al., "Keyholes, Correlations, and Capacities of Multielement Transmit and Receiver Antennas," IEEE Transactions on Wireless Communications, vol. 1, No. 2, Apr. 2002, pp. 361-368.
Junqiang et al., "Spatial Multiuser Access with MIMO Smart Antennas for OFDM Systems," IEEE VTC '2001, Sep. 2001, pp. 1553-1557.
Stridh et al., "MIMO Channel Capacity on a Measured Indoor Radio Channel at 5.8 GHz," Proc. Of the Asilomar Conf. on Signals, Systems & Computers, vol. 1, Oct. 2000, pp. 733-737.
Jungnickel et al., "A MIMO WLAN Based on Linear Channel Inversion," IEEE Seminar-MIMO Communication Systems from Concept to Implementation, Dec. 2001, pp. 20/1-20/6.
Stridh et al., "Spatial Characterization of Indoor Radio Channel Measurements at 5 GHz," SAM '2000, Mar. 2000, pp. 58-62.
Irmer, Ralf et al., "MISO Concepts for Frequency-Selective Channels," 2002 International Zurich Seminar on Broadband Communications Access, Feb. 19-21, 2002.
Choi, Ruly Lai-U et al., "MISO CDMA Transmission with Simplified Receiver for Wireless Communication Handsets," IEEE Transactions on Communications, vol. 49, No. 5, May 2002.
Meyer-Ottens, Sven et al., "Downlink Beamforming for W-CDMA Using Feedback and Interference Estimate," Mar. 9, 2001.
Brunner, Christopher et al., "Downlink Beamforming for WCDMA Based on Uplink Channel Parameters," Proc. EPMCC 1999, pp. 375-380, Mar. 1999.
Yang, Jian et al., "On Joint Transmitter and Receive Optimization for Multiple-Input-Multiple-Output (MIMO) Transmission System," IEEE Transactions on Communications, vol. 42, No. 12, Dec. 1994.
Ivrlac, Michel et al., "On Channel Capacity of Correlated MIMO Channels," ITG Fokusprojekt: Mobilkommunikations Systeme mit intelligenten Antennen, Ilmenau, 2001.
Bablan et al., "Optimum Diversity Combining and Equalization in Digital Data Transmission with Applications to Cellular Mobile Radio-PartII: Numerical Results", May 1992, IEEE Transactions on Communications, vol. 30, No, 5, pp. 895-907.
Chuah et al., "Capacity of Multi-Antenna Array Systems in Indoor Wireless Environment", Nov. 1998, IEEE Globecom.
Wallace et al., "Experimental Characterization of the MIMO Wireless Channel: Data Acquisition and Analysis", Feb. 27, 2002, Department of Electrical and Computer Engineering, Brigham Young University.
Love et al., "Equal Gain Transmission in Multiple-Input Multiple-Output Wireless Systems", Nov. 2002, Proceedings of IEEE Globecom, pp. 1124-1128.
Lucent Technologes, "Lucent Technologies' Chips Poised to Bring "BLAST" Multiple Input/Multiple Output Technology to Laptops, PDAs and Other Mobile Devices," Oct. 16, 2002, lucent.com.
"Lucent's "Blast" chips to take off in wireless market", Oct. 16, 2002, Semiconductor Business News.
Heath et al., "A Simple Scheme for Transmit Diversity Using Partial Channel Feedback," 1998, IEEE.
Chiu, et al., "OFDM Receiver Design," EE225C, Fall 2000, University of California, Berkely.
Shtrom, et al., "Designing MIMO Systems for Reliable Coverage in Non-LOS Wireless Links," Oct. 2002, www.rfdesign.com.
"BLAST High-Level Overview", Lucent Technologies, Jul. 18, 2000.
Aziz et al., "Indoor Throughput and Range Improvements Using Standard Complaint AP Antenna Diversity in IEEE 802.11a and ETSI HIPERLAN/2", Vehicular Technology Conference, 2002, VTC 2001, Oct. 7-11, 2001, IEEE VTS 54th, vol. 4, pp. 2294-2298.
Briesemeister et al., "Role-Based Multicast in Highly Mobile but Sparsely Connect Ad-Hoc Networks"; First Annual Workshop on Mobile Ad Hoc Networking & Computing; pp. 45-50; Aug. 2000.
Brunner et al., "Downlink Beamforming for WCDMA Based on Uplink Channel Parameters"; Proceedings of 3rd European Personal Mobile Conference (EPMCC '99), Mar. 1999, pp. 375-380.
Chiu et al., "OFDM Receiver Design", EE225C, Fall 2000, University of California, Berkeley.
Chizhik et al., "Keyholes, Correlations, and Capacities of Multielement Transmit and Receiver Antennas", IEEE Transactions on Wireless Communications, vol. 1, No. 2, Apr. 2002, pp. 361-368.
Choi et al., "MISO CDMA Transmission with Simplified Receiver for Wireless Communicaion Handsets", IEEE Transactions on Communications, vol. 49, No. 5, May 2002.
Golden et al., "Detection Algorithm and Initial Laboratory Results Using V-BLAST Space-Time Communication Architecture", Electronic Letters, Jan. 7, 1999, vol. 35, No. 1.
Golden et al., "V-BLAST: A High Capacity Space-Time Architecture for the Rich-Scattering Wireless Channel", Bell Laboratories, Lucent Technologies, Proc. Int'l Symposium on Advanced Radio Technologies, Boulder, CO, Sep. 10, 1998.
Irmer et al., "MISO Concepts for Frequency-Selective Channels", 2002 International Zurich Seminar on Broadband Communications Access, Feb. 19-21, 2002.
Iserte et al., "Iterative Algorith for the Estimation of Distributed Sources Localization Parameters", SSP 2001, 11th IEEE Workshop on Statistical Signal Processing, Aug. 2001.
Iserte et al., "Joint Beamforming Strategies in OFDM-MIMO Systems", ICASSP 2002, IEEE International Conference on Acoustics, Speech and Signal Processing, May 2002.
Iserte et al., "Pre-and Post-Beamforming in MIMO Channels Applied to HIPERLAN/2 and OFDM", IST Summit 2001, IST Mobile Communications Summit, Sep. 2001.
Ivrlac et al., "On Channel Capacity of Correlated MIMO Channels", ITG Fokusprojekt: Mobilkommunikation "Systeme mit Intelligenten Antennen", Ilmenau, 2001.
Jakes, "Microwave Mobile Communications", Copyright 1974, pp. 313-320 and pp. 489-498.
Jungnickel et al., "A MIMO WLAN Based on Linear Channel Inversion", IEE Seminar-MIMO Communication Systems from Concept TO Implementation, Dec. 2001, pp. 20/1-20/6.
Jungnickel et al., "Performance of a MIMO System with Overlay Pilots", IEEE GlobeCom 2001, pp. 594-598.
Junqiang et al., "Spatial Multiuser Access with MIMO Smart Antennas for OFDM Systems", IEEE VTC 2001, Sep. 2001, pp. 1553-1557.
Lee et al., "Antenna Diversity for an OFDM System in a Fading Channel", Proceeding of IEEE MILCOM 1999, Nov. 1999, pp. 1104-1109.

"Lucent's 'BLAST' Chips to Take Off in Wireless Market", EETimes.com, Oct. 16, 2002.

Lucent Technologies, "Lucent Technologies: Chips Poised to Bring 'BLAST' Multiple Input/Multiple Output Technology to Laptops, PDAs and Other Mobile Devices", Oct. 16, 2002, lucent.com.

Meyer-Ottens, et al. "Downlink Beamforming for W-CDMA Using Feedback and Interference Estimate", Mar. 9, 2001.

Morgan, "Interaction of Adaptive Antenna Arrays in an Arbitrary Environment", The Bell System Technical Journal, Jan. 1965, pp. 23-47.

Raleigh et al., "Spatio-Temporal Coding for Wireless Communication", IEEE Transactions on Communications, vol. 46, No. 3, Mar. 1998, pp. 357-366.

Sanchez et al., "CSMA/CA Beam Forming Antennas in Multi-hop Packet Radio"; Proc. For Swedish Workshop on Wireless Ad-Hoc Networks, Mar. 5-6, 2001.

Stridh et al., "Spatial Characterization of Indoor Radio Channel Measurements at 5 GHz", SAM 2000, Mar. 2000, pp. 58-62.

Shtrom et al., "Designing MIMO Systems for Reliable Coverage in Non-LOS Wireless Links", Oct. 2000, www.rdesign.com.

Vaidyanathan et al., "The Role In Lossless Systems in Modern Digital Signal Processing: A Tutorial", IEEE Transactions on Education, vol. 32, Aug. 1989, pp. 181-197.

Wolniansky et al., "V-BLAST: An Architecture for Realizing Very High Data Rates Over the Rich-Scattering Wireless Channel", Proc. ISSSE-98, Pisa, Italy, Sep. 29, 1998.

Yang et al., "On Joint Transmitter and Receive Optimization for Multiple-Input-Multiple-Output (MIMO) Transmission Systems", IEEE Transactions on Communications, vol. 42, No. 12, Dec. 1994.

Yeh, "An Analysis of Adaptive Retransmission Arrays in a Fading Environment", The Bell System Technical Journal, Oct. 1970, pp. 1811-1825.

"BLAST High-Level Overview", Lucent Technologies, Jul. 18, 2000.

Aziz et al., "Indoor Throuptut and Range Improvements Using Standard Complaint AP Antenna Diversity in IEEE 802.11a and ETSI HIPERLAN/2", Vehicular Technology Conference, 2002, VTC 2001, Oct. 7-11, 2001, IEEE VTS 54$^{th}$, vol. 4, pp. 2294-2298.

Bablan et al., "Optimum Diversity Combining and Equalization in Digital Data Transmission with Applications to Celluar Mobile Radio-Part II: Numerical Results"; May 1992; IEEE Transactions on Communications, vol. 30, No. 5; pp. 895-907.

* cited by examiner

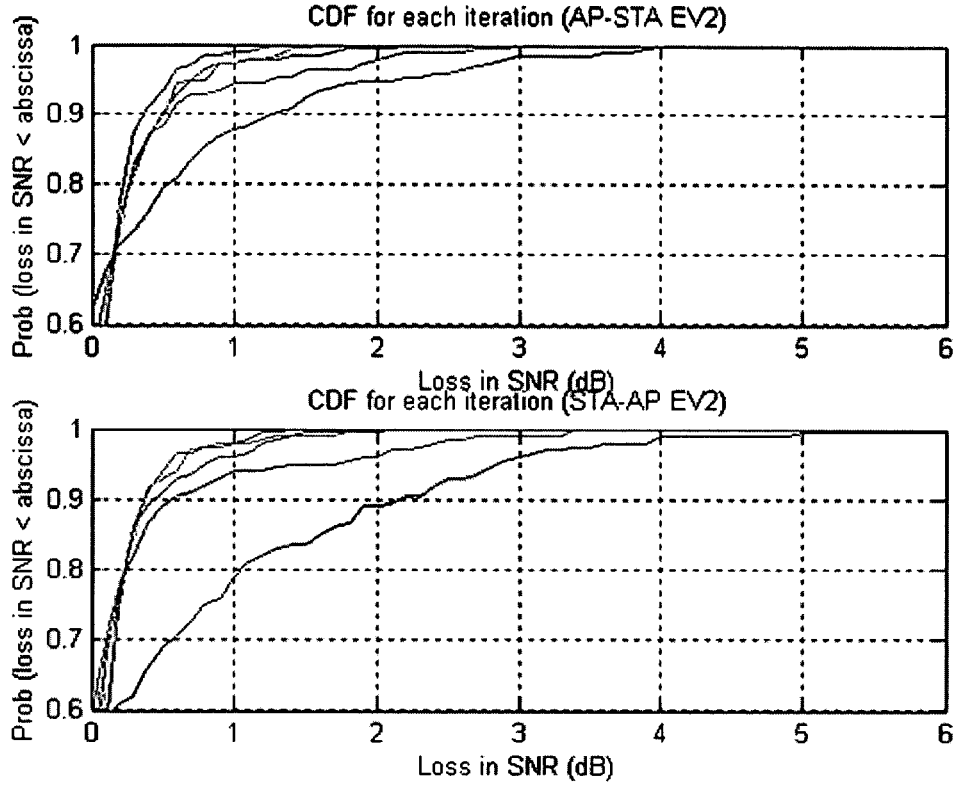
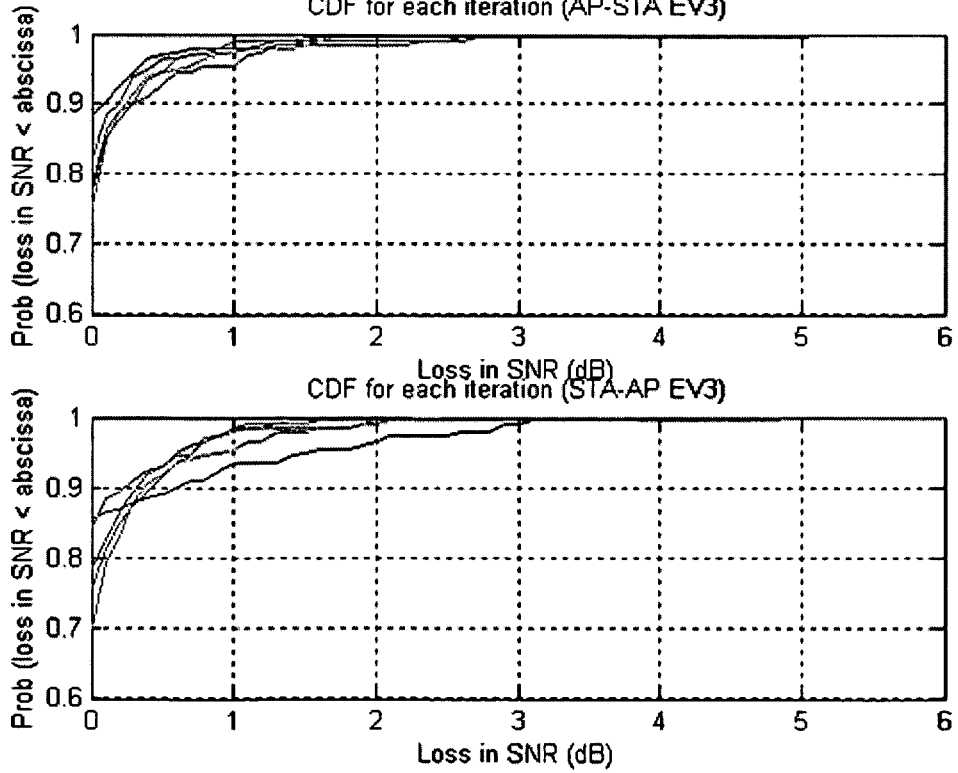

SYSTEM AND METHOD FOR TRANSMIT WEIGHT COMPUTATION FOR VECTOR BEAMFORMING RADIO COMMUNICATION

This application is a continuation-in-part of U.S. application Ser. No. 10/627,537, filed Jul. 25, 2003, entitled "System and Method for Multiple-Input Multiple-Output (MIMO) Radio Communication" and claims priority to the following provisional applications (the entirety of each of which is incorporated herein by reference):

U.S. Provisional Application No. 60/461,672, filed Apr. 10, 2003.

U.S. Provisional Application No. 60/479,945, filed Jun. 19, 2003.

U.S. Provisional Application No. 60/511,530, filed Oct. 15, 2003.

This application is related to U.S. application Ser. No. 10/779,269, filed on even date, and entitled "Compensation Techniques for Group Delay Effects in Transmit Beamforming Radio Communication".

BACKGROUND OF THE INVENTION

The present invention is directed to a system and method to maximize capacity and/or range of a wireless radio communication link between two radio communication devices.

Multiple-input multiple-output (MIMO) radio communication techniques are known to enhance the received SNR for signals transmitted by one device to another. Research in MIMO radio algorithms has been conducted in which multiple signal streams are transmitted simultaneously from multiple antennas at one device to another device, thereby greatly enhancing the data rate of the wireless radio channel between two devices. Such multiple signal stream systems are also referred to as "vector" communication systems, where a vector comprises a plurality of sub-channels that corresponding to the multiple signal streams. Moreover, the term eigenmodes or mode is also used to refer to a sub-channel or signal stream.

The aforementioned U.S. application Ser. No. 10/627,537 discloses a system, method and device for vector transmit beamforming communication of multiple signals (signal streams) between a first device having N plurality of antennas and a second device having M plurality of antennas. Unlike prior approaches, the approach described in that commonly assigned and related application is to impose a power constraint on each transmit antenna path at the transmitting device. The performance of a system in which the communication devices are designed around a power constraint at each antenna is nearly as good as the optimal waterfilling solution, yet provides significant implementation advantages. The radio transmitter can be implemented with power amplifiers that require lower power output capability, and thus less silicon area. Consequently, there is lower DC current drain by the transmitter, and lower on-chip interference caused by the power amplifiers.

In vector radio communication systems that simultaneously transmit multiple signals (modes) between first and second devices using MIMO radio techniques, it is necessary to use appropriate values for transmit weights conditioned to the radio channel between the two devices. While techniques have been developed for this purpose, there is nevertheless room for improvement in this area.

SUMMARY OF THE INVENTION

A system and method are provided for vector wireless radio communication (multiple modes or signal streams) between a first communication device and a second communication device, and particularly to method that adaptively updates the transmit parameters for transmitting multiple modes between two devices. At the first communication device, signals are received at a plurality of antennas representing a plurality of modes simultaneously transmitted by the second communication device, wherein each mode is a signal stream. The first communication device computes a transmit matrix from parameters derived from signals received at its plurality of antennas. The transmit matrix distributes a plurality of modes among a plurality of antenna paths each associated with a corresponding one of the plurality of antennas of the first communication device. The transmit matrix is applied to the plurality of modes to be simultaneously transmitted from the plurality of antennas of the first communication device to the second communication device. Similarly, the second communication device receives signals at a plurality of antennas representing a plurality of modes simultaneously transmitted by the first communication device. The second communication device computes a transmit matrix from parameters derived from signals received at its plurality of antennas. The transmit matrix distributes a plurality of modes among a plurality of antenna paths each associated with a corresponding one of the plurality of antennas of the second communication device and is applied to the plurality of modes to be simultaneously transmitted from the plurality of antennas of the second communication device to the first communication device. The step of computing the transmit matrix at each of the first and second communication devices is repeated each time signals are received from the other communication device to update the transmit matrix each device uses to transmit to the other. The transmit matrix at each of the devices may be determined by computing the orthogonalization of a matched filter matrix derived from received signals. If a multi-carrier modulation scheme (e.g., OFDM) is used for each of the plurality of modes, the step of computing the transmit matrix may be performed at each of a plurality of frequency sub-carriers associated with the multi-carrier modulation scheme.

In addition, techniques are provided to select a transmit data rate separately for each mode transmitting from one device to the other device based on received SNR information for each mode. These rate selection techniques may be invoked each time a transmission is received at one device from the other to dynamically update the transmit data rate for each individual mode.

BRIEF DESCRIPTION OF THE DRAWINGS

FIG. 9 is a graph showing the loss in SNR at each iteration for the second principal eigenvector.

FIG. 10 is a graph showing the loss in SNR at each iteration for the third principal eigenvector.

DETAILED DESCRIPTION OF THE DRAWINGS

Figure 1:
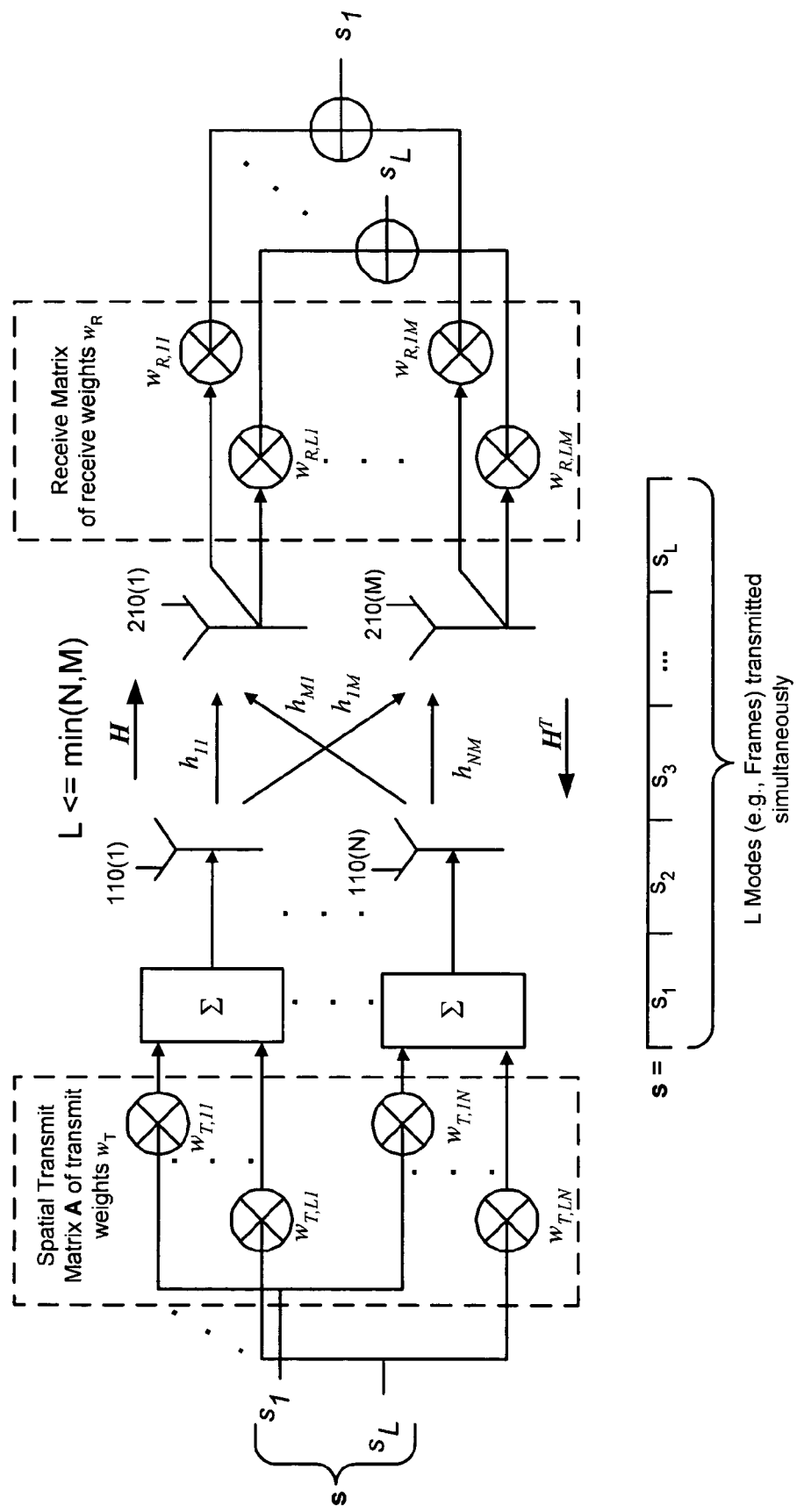
FIG. 1 is a system diagram showing two multiple-antenna radio communication devices each of which transmits multiple modes to the other device.
Figure 2:
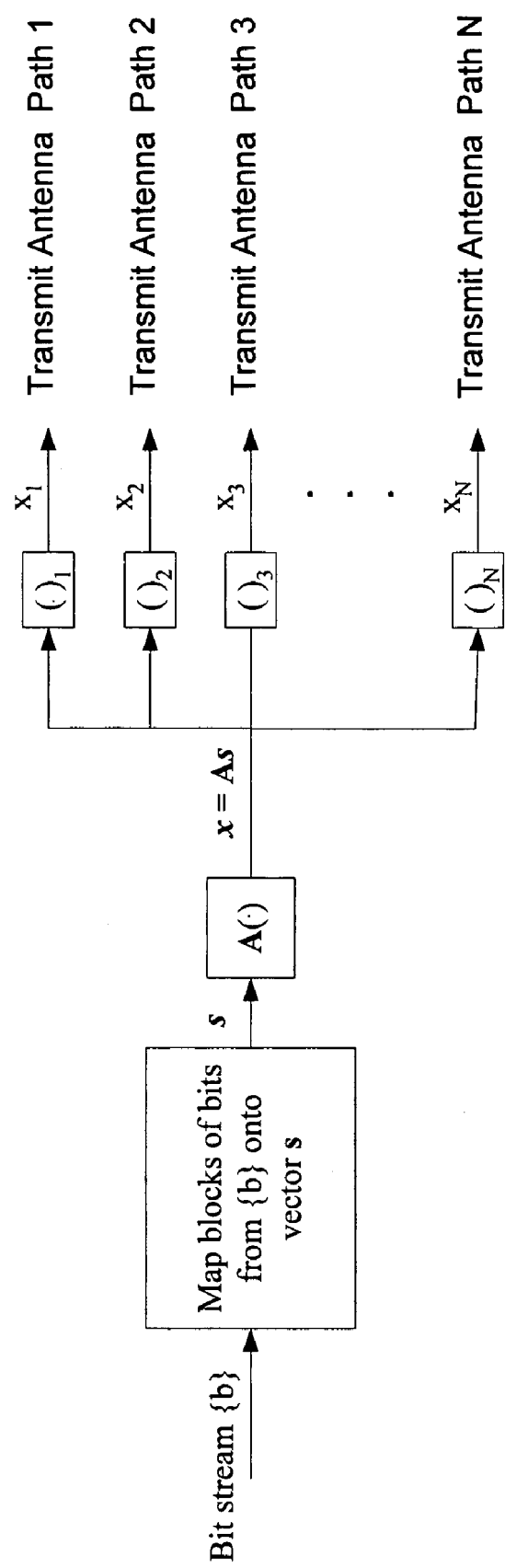
FIG. 2 is a flow chart depicting the mapping and multiplexing of modes to multiple antenna paths for simultaneous transmission.

Referring to FIGS. 1 and 2, a system 10 is shown in which a first radio communication device 100 having N antennas 110(1) to 110(N) communicates by a wireless radio link with a second communication device 200 having M antennas 210(1) to 210(M). In the explanation that follows, the first communication device transmits to the second communication device, but the same analysis applies to a transmission from the second communication device to the first. The multiple-input multiple-output (MIMO) channel response from the N antennas of the first communication device to the M antennas of the second communication device is described by the channel response matrix H. The channel matrix in the opposite direction is $H^T$.

Using beamforming techniques, device 100 will simultaneously transmit L eigenmodes (modes) $s_1, s_2, \ldots, s_L$ by antennas 110(1) to 100(N). A vector s is defined that represents the L modes $[s_1 \ldots s_L]$ (at baseband) to be transmitted such that $s=[s_1 \ldots s_L]^T$. The number (L) of modes that can be simultaneously transmitted depends on the channel H between device 100 and device 200, and in particular L≦Rank of $H^H H$≦min(N,M). For example, if N=4, and M=2, then L≦Rank of $H^H H$≦2. Each eigenmode is a signal or signal stream, such as a data stream, data block, data packet, data frame, etc.

Two matrices are introduced: V is the eignenvector matrix for $H^H H$ and Λ is the eigenvalue matrix for $H^H H$. Device 100 transmits the product As, where the matrix A is the spatial multiplexing transmit matrix, where A=VD. The matrix D=diag($d_1, \ldots, d_L$) where $|d_p|^2$ is the transmit power in $p^{th}$ mode, or in other words, the power of the $p^{th}$ one of the L signals. Device 200 receives HAs+n, and after maximal ratio combining for each of the modes, device 200 computes $c=A^H H^H HAs+A^H H^H n=D^H DAs+D^H V^H H^H n$. The matrix A is shown below.

$$A = VD = W_T = \begin{bmatrix} w_{T,11} & w_{T,21} & \cdot & w_{T,L1} \\ w_{T,12} & & & \cdot \\ \cdot & & & \cdot \\ \cdot & & & \cdot \\ w_{T,1N} & \cdot & \cdot & w_{T,LN} \end{bmatrix}$$

As shown in FIG. 2, at the first device 100, blocks of bits from a bit stream {b} may be mapped onto a vector s with a mapping technique. The mapping technique may optionally include coded modulation to improve link margin. The bit stream {b} may be a file or collection of bits (data packets, blocks, streams), representing any type of data, such as voice, video, audio, controls, computer data, etc., that is divided or otherwise separated into discrete frames, blocks or substreams (generally referred to as signals) to be spatially multiplexed and simultaneously transmitted. One example is the simultaneous transmission of multiple IEEE 802.11x frames (each $s_i$ may be a different frame) from the first device 100 to the second device 200, where, for example, the first device 100 is an IEEE 802.11 access point (AP) and the second device is a client station (STA). Thus, each eigenmode or mode is a signal stream, which may be a substream of a single data signal stream. Other terminology used in the art for the same concepts are a vector channel or space formed by a plurality of sub-channels or spaces, where the term "vector channel" is analogous to plurality of modes, and a "sub-channel" is analogous to a mode.

The product of the transmit matrix A and the vector s is a vector x. This matrix multiplication step effectively weights each element of the vector s across each of the N antennas, thereby distributing the plurality of signals among the plurality of antennas for simultaneous transmission. Components $x_1$ through $x_N$ of the vector x resulting from the matrix multiplication block are then coupled to a corresponding antenna of the first communication device. For example, component $x_1$ is the sum of all of the weighted elements of the vector s for antenna 1, component $x_2$ is the sum of all of the weighted elements of the vector s for antenna 2, etc.

The transmit matrix A is a complex matrix comprised of transmit weights $w_{T,ij}$, for i=1 to L and j=1 to N. Each antenna weight may depend on frequency to account for a frequency-dependent channel H. For example, for a multi-carrier modulation system, such as an orthogonal frequency division multiplexed (OFDM) system, there is a matrix A for each sub-carrier frequency k. In other words, each transmit weight $w_{T,ij}$ is a function of sub-carrier frequency k. For a time-domain (single-carrier) modulation system, each transmit weight $w_{T,ij}$ may be a tapped-delay line filter.

Prior approaches involve selecting the weights $d_p$ to maximize capacity $$C = \sum_{p=1}^{L} \log(1 + SNR_p), \quad SNR_p = |d_p|^2 \lambda_p \frac{E(|s_p|^2)}{E(|n_p|^2)}$$

subject to a total power constraint emitted by the plurality of transmit antennas combined on the transmit matrix A, i.e., $$P_{TOT} = \text{Tr}(AA^H) \cdot E|s_p|^2 = \text{Tr}(VDD^H V^H) \cdot E|s_p|^2$$
$$= \text{Tr}(VDD^H V^H) < P_{\max} (\text{assuming } E|s_p|^2 = 1)$$

The optimum solution to this problem is to use waterfilling to select the weights $d_p$ (i.e., use waterfilling to put more power in eigenchannels with higher SNR $\lambda_p$).

The waterfilling approach requires N full-power capable power amplifiers at the transmitting device since, for some channels, it is possible for the optimal solution to require all or nearly all the transmit power to be sent from one antenna path. To reiterate, the prior approaches constrain the total power emitted from all of the antenna paths combined, simply $\Sigma P_i = P_{TOT} < P_{max}$ (for i=1 to N antennas) where $P_{max}$ is a total power constraint and $P_i$ is the power from transmit antenna path i.

A better approach is to use a power constraint for each individual transmit antenna path. One such constraint is that the power transmitted from each antenna is less than the total power transmitted from all N antennas combined ($P_{max}$) divided by N, e.g., $P_i \leq P_{max}/N$ for all i. Using this approach, referred to as the "antenna power constraint" approach, each power amplifier can be designed to output (no more than) $P_{max}/N$ average power, where $P_{max}$ is the maximum power of the transmission from all of the N antennas combined. A significant benefit of this approach is that the power amplifiers can be designed to have lower maximum output power capability, thus requiring less silicon area. The use of smaller and lower-output power amplifiers has the benefit of lower on-chip power amplifier interference and lower DC current drain.

Using a $P_{max}/N$ power constraint for each antenna, the problem becomes:

Maximize capacity C subject to $(AA^H)_{ii} < P_{max}/N$, i=1, ..., N.

This is a difficult problem to solve for $d_p$, since it involves finding the roots of a non-linear function using N Lagrange multipliers (one for each of the above N constraints). However, there is a simple non-optimal solution for each of two cases.

Case 1: N≤M:

In this case, the transmitting device (having N plurality of antennas) multiplies the vector s representing the L modes $[s_1 \ldots s_L]^T$ to be transmitted with the transmit matrix A (i.e., computes As), where the transmit matrix A is computed with D set equal to $I \cdot sqrt(P_{max}/N)$ (where I is the identity matrix) enforcing equal power in each mode. As a result, $H^H H$ is Hermitian and (with probability 1) is full-rank, which means that V is orthonormal. Consequently, $(AA^H)_{ii} = (VDD^H V^H)_{ii} = (VV^H)_{ii} P_{max}/N = P_{max}/N$, which means that equal power $P_{max}/N$ is transmitted at each antenna by a corresponding power amplifier of device 100, and the total transmit power is equal to $P_{max}$.

Case 2: N>M:

In this case, $H^H H$ is not full-rank. Let $v_1, \ldots, v_L$ denote the L eigenvectors for $H^H H$ having nonzero eigenvalues. Let $V = [v_1 \ldots v_L]$, and let $D = sqrt(d \cdot P_{max}/N) \cdot I$, where the power for each mode is the same and $d_p = d$ for p=1 to L. The power in antenna path i is given by $(d \cdot P_{max}/N)(VV^H)_{ii}$. Thus, the power emitted from each of the i antenna paths may be different. The transmitting device (having the N antennas) multiplies the vector s representing the L modes $[s_1 \ldots s_L]^T$ to be transmitted with the transmit matrix A (i.e., computes As), where the transmit matrix A is computed with D set equal to $sqrt(d \cdot P_{max}/N) \cdot I$, where the power for each mode is the same and $d_p = d$ for p=1 to L. 10/21/04 10779268/3

Approach 1: Set d=1/z, where $\{(VV^H)_{ii}\}$. Then the maximum power from any antenna path is $P_{max}/N$. The total power from all antenna paths can be shown to be at least $P_{max}/M$ and no greater than $P_{max}$.

Approach 2: Set d=1. In this case, the total power emitted by the N plurality of antennas is $P_{max}/M$ and the power emitted by antenna i for i=1 to N is $(P_{max}/N) \cdot (VV^H)_{ii}$.

Assuming the power amplifiers at devices on both sides of the link have the same peak output power, then for Case 1 and Case 2/Approach 2, the total power transmitted from the N antenna device will be equal to the total power transmitted from the M antenna device. Hence, the link between the two devices is symmetric in these situations. Case 2/Approach 1 is slightly more complicated (since it requires a normalization step) but has more transmitted power than Approach 2.

The solutions described above are capable of performing within 1 dB of the Shannon limit for a symmetric system (same number of antennas on both sides of the link), but facilitate use of smaller and more efficient power amplifiers in the radio transceiver, and as a result, achieve lower on-chip interference between radio paths (caused by the power amplifiers) than the waterfilling solution.

The antenna power constraint need not be the same for each of the transmit antennas and may be specific to or different for each antenna. Moreover, even if a different antenna power constraint is used for each antenna, each of the antenna-specific power constraints may be less than or equal to $P_{max}/N$.

The device 200 with M plurality of antennas will transmit to device 100 subject to the same type of power constraint at each of the M plurality of antennas. The cases described above are applied where M is compared relative to N, and the appropriate solution is used for transmitting signals to device 100.

Figure 3:
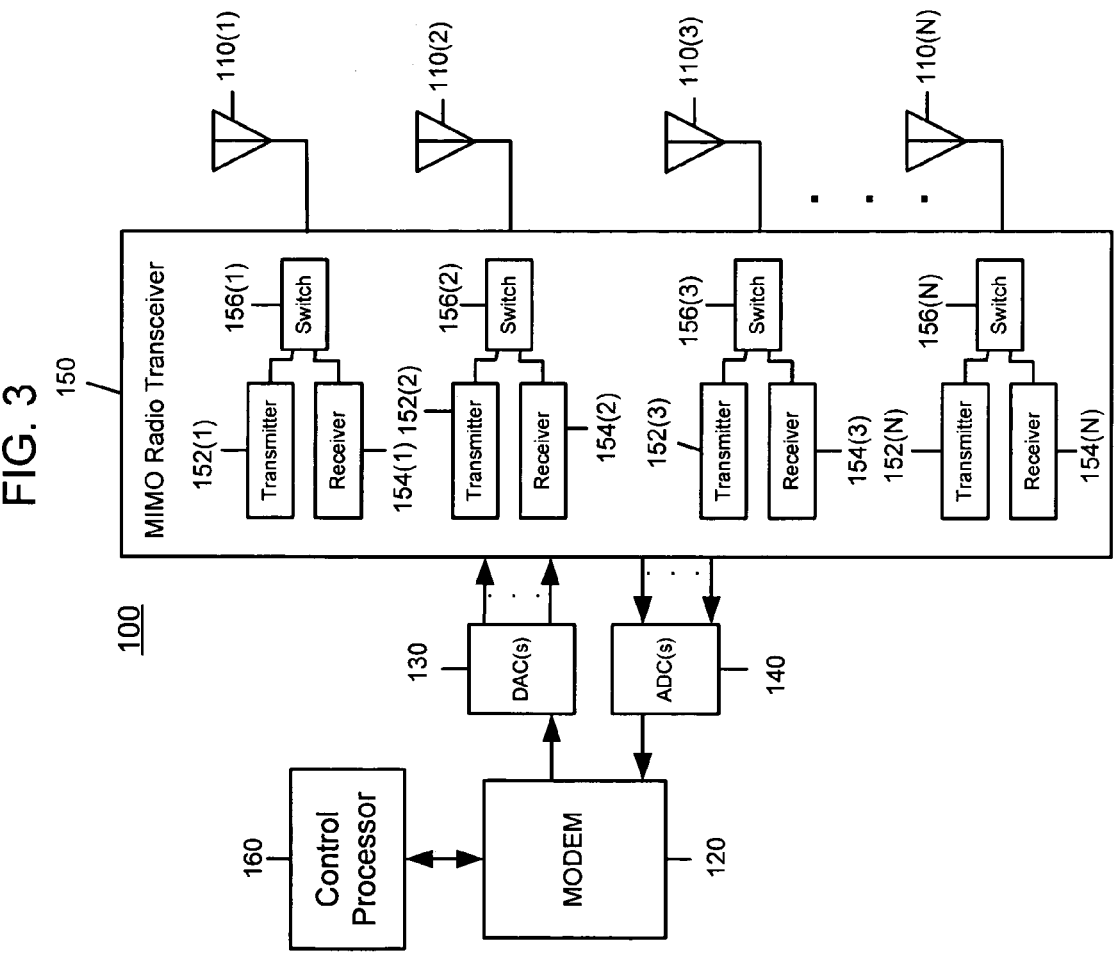
FIG. 3 is a block diagram of a radio communication device capable of performing the vector beamforming communication techniques described herein.

FIG. 3 shows a block diagram of a radio communication device suitable for devices 100 and 200. Device 100 comprises a modem 120, a plurality of digital-to-analog converters (DACs) 130, a plurality of analog-to-digital converters (ADCs) 140, a MIMO radio transceiver 150 coupled to antennas 110(1) to 110(N) and a control processor 160. The modem 120, also referred to as a baseband signal processor, performs the baseband modulation of signals to be transmitted (vector s) and the baseband demodulation of received signals. In so doing, the modem 120 multiplies the vector s representing the L modes $[s_1 \ldots s_L]^T$ to be transmitted by the transmit matrix A. The DACs 130 are complex DACs that convert the digital baseband modulated signals representing As to corresponding analog signals coupled to transmit paths in the MIMO radio transceiver 150. The ADCs 140 convert the received analog signals from corresponding receive paths in the MIMO radio transceiver 150 to digital signals for baseband demodulation by the modem 120. In the baseband demodulation process, the modem 120 will apply appropriate receive weights to the received signals to recover the L modes $[s_1 \ldots s_L]^T$. The MIMO radio transceiver 150 comprises a plurality of radio transceivers each comprising a transmitter 152(i) and a receiver 154(i) associated with and coupled to a corresponding antenna by a corresponding switch 156(i). Each transmitter includes a power amplifier (not shown). The MIMO radio transceiver 150 may be a single integrated circuit or two or more separate integrated circuits. An example of a single-integrated MIMO radio transceiver is disclosed in co-pending and commonly assigned U.S. patent application Ser. No. 10/065,388, filed Oct. 11, 2002, the entirety of which is incorporated herein by reference.

Figure 4:
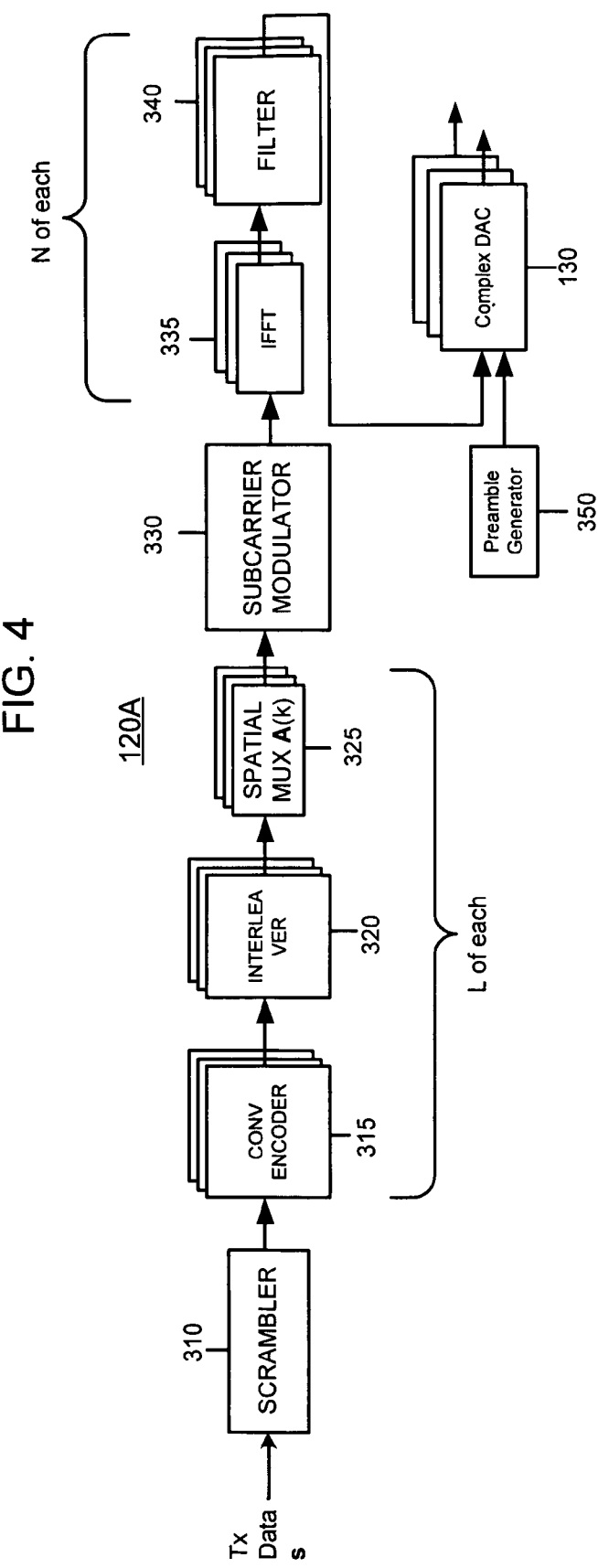
FIG. 4 is a block diagram of an exemplary transmitter section of a modem forming part of the device shown in FIG. 3.
Figure 5:
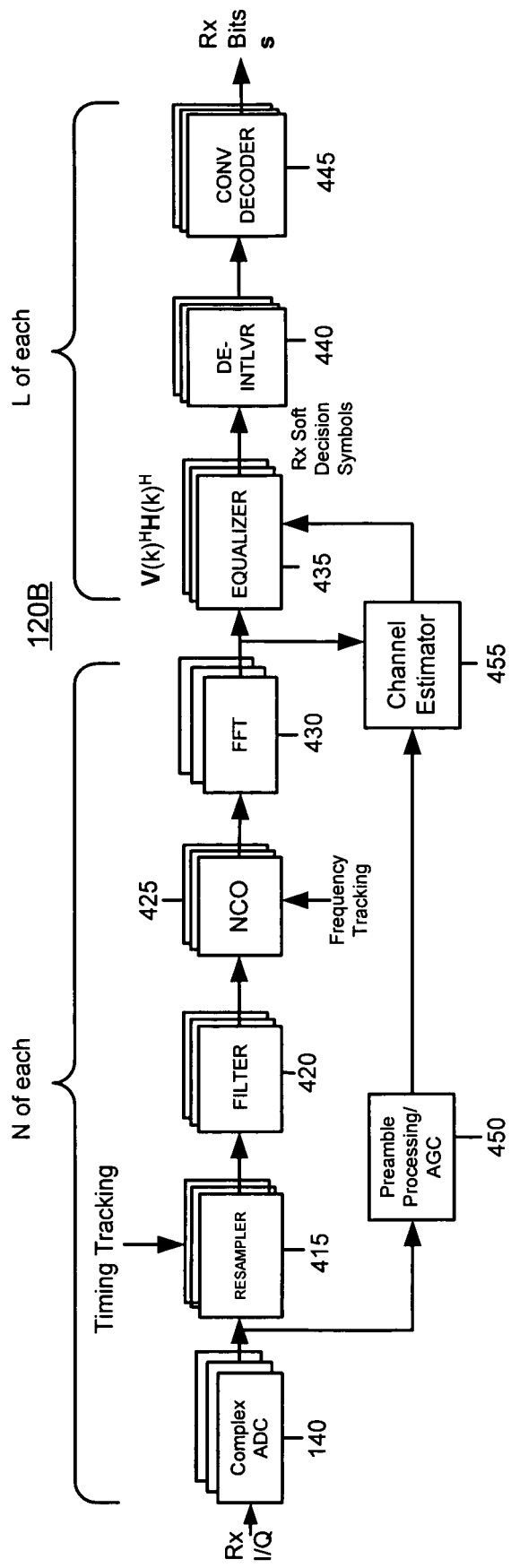
FIG. 5 is a block diagram of an exemplary receiver section of the modem.

There are many ways to implement the modem 120. FIGS. 4 and 5 show block diagrams of examples of the transmitter section 120A and receiver sections 120B, respectively, of the modem 120, for a multi-carrier, e.g., orthogonal frequency division multiplexed (OFDM) application. Generally, matrix multiplication of the type described above is performed independently on each OFDM subcarrier to optimize performance for indoor frequency-selective fading channels. With reference to FIG. 4, the transmitter section 120A of the modem comprises a scrambler block 310, a block 315 of convolutional encoders, a block 320 of interleavers, a spatial multiplexer block 325 that performs the matrix multiplication with the transmit matrix A that is different at each of the OFDM sub-carriers k (i.e., A=A(k), such that $A(k)s(k)=W_T(k)s(k)$), a sub-carrier modulator 330, a block 335 of inverse Fast Fourier Transforms (IFFTs) and a block 340 of low pass filters. The output of the low pass filters block 340 is coupled to the DACs 130 (FIG. 3). A preamble generator 350 is also provided and is coupled to the DACs 130. As shown in FIG. 4, assuming the modem is in an N antenna device, there are L instances of blocks 315, 320 and 325 to perform processing on each mode (baseband transmit signal stream) and N instances of blocks 335, 340 and 130 for processing signals associated with each transmit antenna path.

The receiver section 120B shown in FIG. 5 comprises a block 415 of resamplers, a block of lowpass filters 420, a block 425 of numerically controlled oscillators (NCOs), a block 430 of FFTs, a block of equalizers 435 in which the receive weights are applied to the receive signals, a block of de-interleavers 440 and a block of convolutional decoders 445. A preamble processing and automatic gain control (AGC) block 450 and a channel estimator block 455 are also provided for channel estimation computations and other functions. The preamble and AGC block 450 recovers a preamble in the received signal and the channel estimator 455 generates knowledge about the channel H, which knowledge is supplied to the equalizer 435 to compute and apply receive weights to the signals output by the FFT block 430. Assuming the modem is in an N antenna device, there are N instances of blocks 415, 420, 425 and 430 to perform processing on each received signal stream and L instances of blocks 435, 440 and 445 to recover the L modes.

Figure 6:
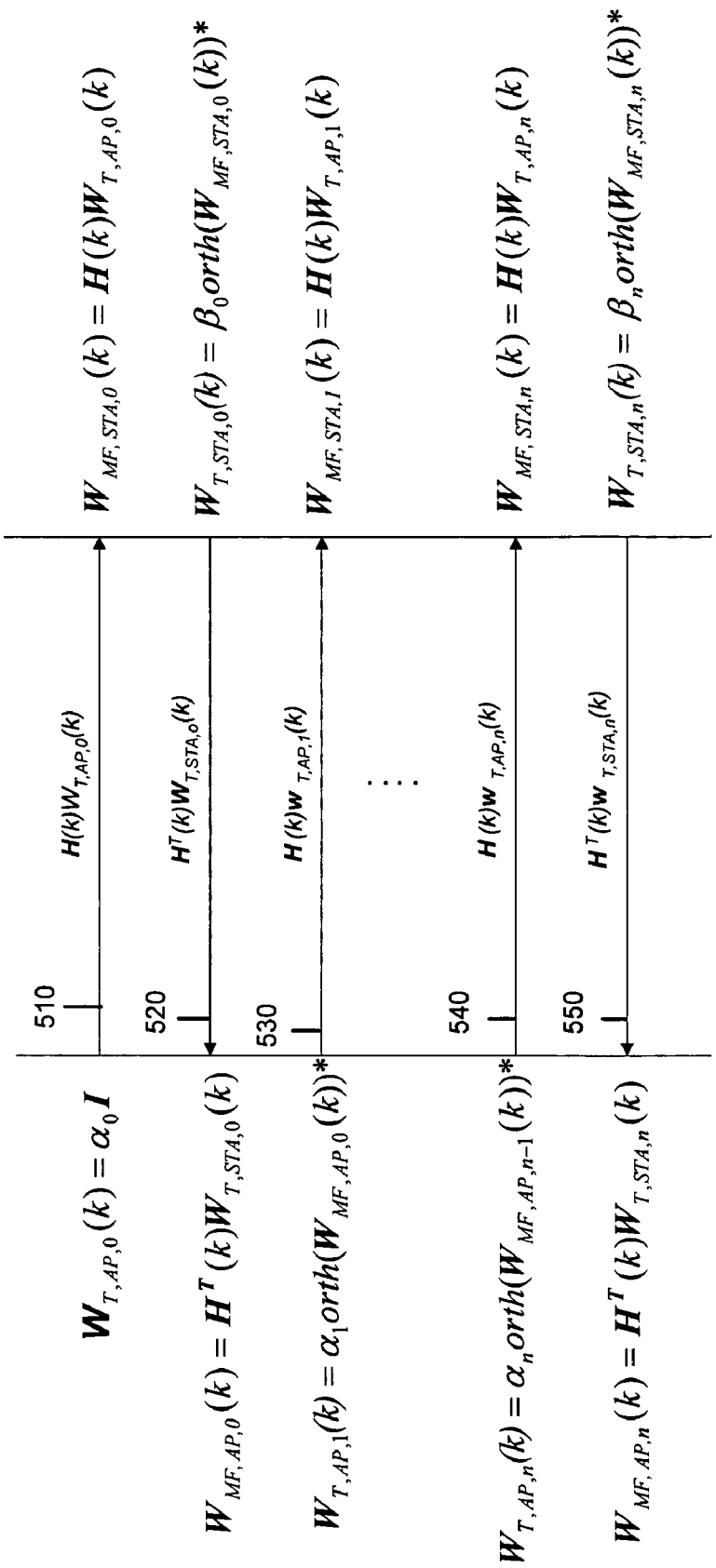
FIG. 6 is a flow chart depicting an adaptive algorithm useful to enable each device to compute transmit weights from signals received from the other device.

Turning to FIG. 6, a procedure is shown to adaptively update the transmit antenna weights at one of the devices based on the receive weights derived from received signals. No explicit training sequence is required. However, a sequence for receiver synchronization and channel estimation in each eigenmode may be useful, an example of which is described hereinafter in conjunction with FIG. 11. The transmit weights converge to the eigenvectors corresponding to the L-largest eigenvalues (where L is the number of independent modes). This procedure also may be used to determine the power in each mode (proportional to eigenvalues), which can be used to facilitate dynamic rate adjustment in each of the eigenmodes.

This adaptive algorithm assumes reciprocity in the link between the devices, and therefore MIMO phase calibration at each device needs to be performed. Techniques for MIMO phase calibration are disclosed in commonly assigned and co-pending U.S. patent application Ser. No. 10/457,293, filed Jun. 9, 2003, the entirety of which is incorporated herein by reference. Information regarding constellation order as a function of sub-carrier index and eigenchannel, as well as the number of antennas at the device, may be included in a preamble or otherwise established during a link set-up. Each sub-carrier has an associated constellation order for each eigenchannel. In the transmitter section 120A, a multi-dimensional vector trellis encoder (VTE) may be used to map input bits from the scrambler onto OFDM constellation symbols. Examples of multi-dimensional VTE's are known in the art.

In order to make the mathematical expressions easier to follow, and only as an example, device 100 is a WLAN AP and device 200 is a WLAN STA. It should be understood that these techniques are applicable to any other wireless radio communication application. The following nomenclature is used.

N=# antennas at AP side of link.

M=# antennas at STA side of link.

H=complex M×N MIMO channel response from AP to STA.

$H^T$=complex N×M MIMO channel response from STA to AP.

L=# modes≦min(N, M).

$W_{T,AP}$, $W_{R,AP}$=Transmit and receive weight matrices, respectively, at AP side of link.

$W_{T,STA}$, $W_{R,STA}$=Transmit and receive weight matrices, respectively, at STA side of link.

$W_{T,AP}$ is written out and shown above; $W_{R,AP}$, $W_{T,STA}$ and $W_{R,STA}$ are similarly defined.

$P_{T,AP}$ and $P_{T,STA}$ are the total transmit powers at the AP and STA, respectively.

The transmit and receive weights computation can be derived using the relationship:

$H = U \Lambda V^H$, $H^T = V^* \Lambda U^T$; where $U_{M \times M}$ and $V_{N \times N}$ are unitary matrices, and $\Lambda_{M \times N}$ is a diagonal matrix.

The ideal transmit weights are:

$W_{T,AP,ideal} = V_{1:N,1:L} D_{L \times L}$ and $W_{T,STA,ideal} = U^*_{1:M,1:L} S_{L \times L}$ D and S are diagonal matrices which specify the power in each mode. They may be computed by constraining the transmit power at all antennas in the AP and STA such that $D_{kk}^2 \leq P_{T,AP}/N$ and $S_{kk}^2 \leq P_{T,STA}/N$. This is referred to as the antenna power constraint referred to above, and the power at each antenna may or may not be equal. One solution for the antenna power constraint is $D_{kk}^2 = 1/\max\{(V_{1:N,1:L} V^H_{1:N,1:L})_{kk}\}$ and $S_{kk}^2 = 1/\max\{(U^*_{1:M,1:L} U^T_{1:M,1:L})_{kk}\}$.

In the foregoing notation, $X_{N \times N}$ denotes a matrix X of size N×N, $X_{1:N,1:L}$ denotes a matrix with rows 1:N and columns 1:L of X and $X_{nk}$ denotes the element in the n-th row and k-th column.

The matched filter weights at the receiver are $W_{MF,STA} = H W_{T,AP,ideal}$ and $W_{MF,AP} = H^T W_{T,STA,ideal}$. The receive weights are the matched filter weights $W_{R,STA} = W_{MF,STA}$ and $W_{R,AP} = W_{MF,AP}$.

The optimum transmit weights ensure that the L modes are orthogonal at the receiver. If the transmit weights do not match the right singular vectors then the receiver may implement a zero-forcing receiver, an MMSE receiver or a non-linear receiver approach.

The optimal solution requires knowledge of channel state information at the transmitter. Implicit knowledge of the channel can be derived from the receive weights. With reference to FIG. 6, a blind adaptive algorithm 500 is shown that is based on implicit channel state information. The algorithm is based on QR iterations which is a numerical technique to find the eigenvalues and eigenvectors of a Hermitian matrix. Initially, since the transmit weights are arbitrary, the SNR for each mode is assumed to be identical. The subscripts T,AP,0 in FIG. 6 indicate that it is a transmit matrix for the AP at iteration 0. Similarly, the subscripts T,STA,0 indicate that it is a transmit matrix for the STA at iteration 0. Furthermore, the scalars α and β are power constraint factors used for the transmit matrices to ensure that the transmitted signals (from the AP to the STA, in the case of the scalar α or STA to the AP in the case of the scalar β) satisfy the aforementioned antenna power constraint for $D_{kk}^2$ and $S_{kk}^2$. This convention is used throughout FIG. 6.

In step 510, a plurality of modes are simultaneously transmitted by the AP using the transmit matrix $W_{T,AP,0}$ to the STA. The STA receives signals at its plurality of antennas representing the plurality of modes simultaneously transmitted by the AP and determines the receive weights by computing the matched filter coefficients for the matched filtered matrix $W_{MF,STA,0}$ from the received signals. In step

520, the STA computes the transmit matrix $W_{T,STA,0}$ by computing the orthogonalization (hereinafter referred to as "orth( )") of the matched filtered matrix $W_{MF,STA,0}$ determined in step 510, multiplied by a scalar $\beta_0$. The transmit matrix may be computed as the conjugate of the orthogonalization of the matched filter matrix, as indicated in FIG. 6. The STA then applies the transmit matrix $W_{T,STA,0}$ to a plurality of modes to be simultaneously transmitted from the STA to the AP. In step 520, the AP computes the matched filter coefficients of the matched filtered matrix $W_{MF,AP,0}$ from the signals received at its plurality of antennas representing the plurality of modes simultaneously transmitted by the STA. In step 530, the AP computes the transmit matrix $W_{T,AP,1}$ by computing the orthogonalization of the matched filtered matrix $W_{MF,AP,0}$ multiplied by a scalar $\alpha_1$, and applies the transmit matrix $W_{T,AP,1}$ to a plurality of modes for simultaneously transmitting the same to the STA. This process repeats as indicated by steps 540 and 550 as signals are transmitted between the AP and the STA Any of the well known techniques, such as QR decomposition and Gram-Schmidt orthogonalization, may be used for the orthogonalization operation. Each time a device receives signals from the other device, it updates its transmit matrix. After a few iterations, the transmit weights converge to the eigenvector corresponding to the maximum L eigenvalues (See, G. Golub, C. V. Loan, "Matrix Computations," $2^{nd}$ edition, p. 351.), and will adapt to changing conditions in the channel. The signal processing shown in FIG. 6 may be performed by the modems (baseband signal processor) of the respective communication devices on the link.

To summarize this adaptive procedure, a method is provided for radio communication between a first communication device and a second communication device using radio frequency (RF) communication techniques. The steps performed at the first communication device are: receiving at a plurality of antennas signals representing a plurality of modes simultaneously transmitted by the second communication device, wherein each mode is a signal stream; computing a transmit matrix from parameters derived from signals received at the plurality of antennas from the second communication device (e.g., receive weights or matched filter matrix) to distribute a plurality of modes among a plurality of antenna paths each associated with a corresponding one of the plurality of antennas of the first communication device; and applying the transmit matrix to the plurality of modes to be simultaneously transmitted from the plurality of antennas of the first communication device to the second communication device. Similarly, at the second communication device, the steps performed are: receiving at a plurality of antennas signals representing a plurality of modes simultaneously transmitted by the first communication device; computing a transmit matrix from parameters derived from signals received at the plurality of antennas from the first communication (e.g., receive weights or matched filter matrix) to distribute a plurality of modes among a plurality of antenna paths each associated with a corresponding one of the plurality of antennas of the second communication device; and applying the transmit matrix to the plurality of modes to be simultaneously transmitted from the plurality of antennas of the second communication device to the first communication device. The step of computing the transmit matrix at each of the first and second communication devices is repeated each time signals are received from the other communication device to update the transmit matrix each device uses to transmit to the other device. The step of computing the transmit matrix at each of the devices involves computing the orthogonalization of the matched filter matrix. If a multi-carrier modulation scheme (e.g., OFDM) is used for each of the plurality of modes, the step of computing the transmit matrix is performed at each of a plurality of frequency sub-carriers associated with the multi-carrier modulation scheme.

As described above, the antenna power constraint places a maximum on the transmit power at all antennas in the AP & STA:

$D_{kk}^2 \leq P_{T,AP}/N$ and $S_{kk}^2 \leq P_{T,STA}/N$.

With this requirement, it is possible to choose any distribution of the power over the different frequency bins of the baseband signals. Thus, the step of computing the transmit matrix at each of the devices may further comprise normalizing the transmit matrix such that the power transmitted from each of the plurality of antennas of the respective communication devices is less than a maximum power. Optimal schemes, such as waterfilling, require knowledge of the SNR at the receiver of the destination device. Since the channel state information is determined implicitly from the receive weights it is difficult to implement an optimal power distribution scheme in both directions of the communication link.

For an OFDM scheme or other multi-carrier modulation schemes, the adaptive algorithm is implemented independently for each sub-carrier frequency (as indicated by the frequency index k in FIG. 6). In fact, in a multi-carrier modulation scheme, such as OFDM, a frequency shaping constraint can be implemented to distribute the power evenly across the OFDM frequency bins of the baseband signals (modes) to be transmitted. The frequency shaping constraint requires that the sum of the power at each corresponding frequency sub-carrier for each mode across (the signals associated with the) plurality of antenna paths is the same and is equal to a constant value. For example, in the context of an OFDM system, the constant value is $P_{TX}/(KN)$, where K is the number of OFDM sub-carriers or frequency bins and N is the number of antenna paths. In implementing the adaptive algorithm shown in FIG. 6, the frequency shaping constraint can be employed in addition to the antenna power constraint described above. In this case, the step of computing the transmit matrix still further comprises computing values for the transmit matrix such that the sum of the power at corresponding sub-carrier frequencies of each mode (each of the plurality of modes) across the plurality of antennas paths is the same, and equal to a constant. Mathematically, the frequency shaping constraint can be expressed as:

$$\sum_n |w_{T,kn}|^2 = P_T/K$$

As an example, if there are two modes $s_1$ and $s_2$, then the transmit weights $w_{T,ij}$, for i=1 to 2 (L=2) and j=1 to 2 (N=2) in the transmit matrix $W_T$ for a 2 antenna device constrained to the frequency shaping constraint, have the following relationship:

$|w_{T,11}(k)|^2 + |w_{T,12}(k)|^2 = |w_{T,21}(k)|^2 + |w_{T,22}(k)|^2$, which is equal to a constant for all sub-carriers or sub-band frequencies k.

Figure 7:
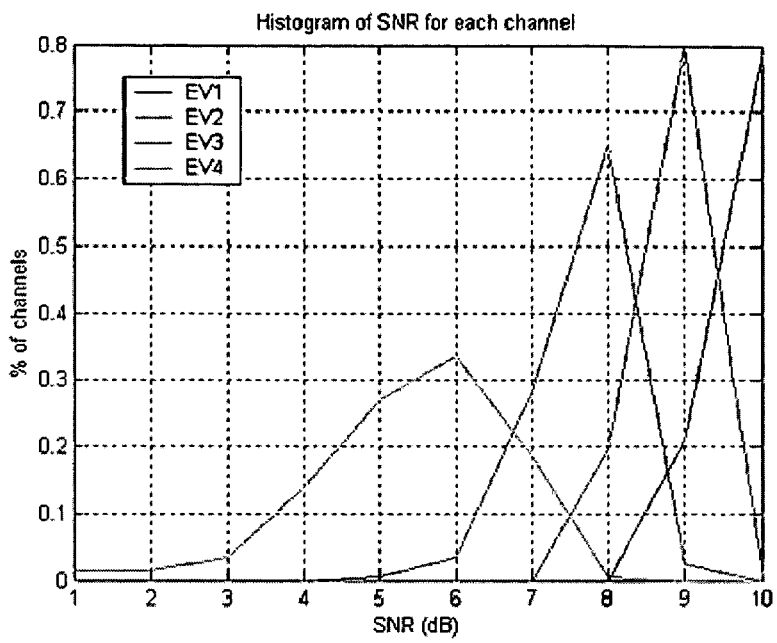
FIG. 7 is a graph showing a histogram of SNR for each eigenvector.

The convergence properties of the adaptive algorithm were studied over 1000 randomly Rayleigh-fading generated channels. The simulation parameters were as follows: N=4, M=4 and L=4. The average SNR at each receive antenna was set to 10 dB. FIG. 7 shows the histogram of the eigenvalue distribution. The normalized antenna array gain at the output of the receive antenna array, $|HW_{T,k}|^2/\lambda_k(H^H H)$, was used to study the performance.

Figure 8:
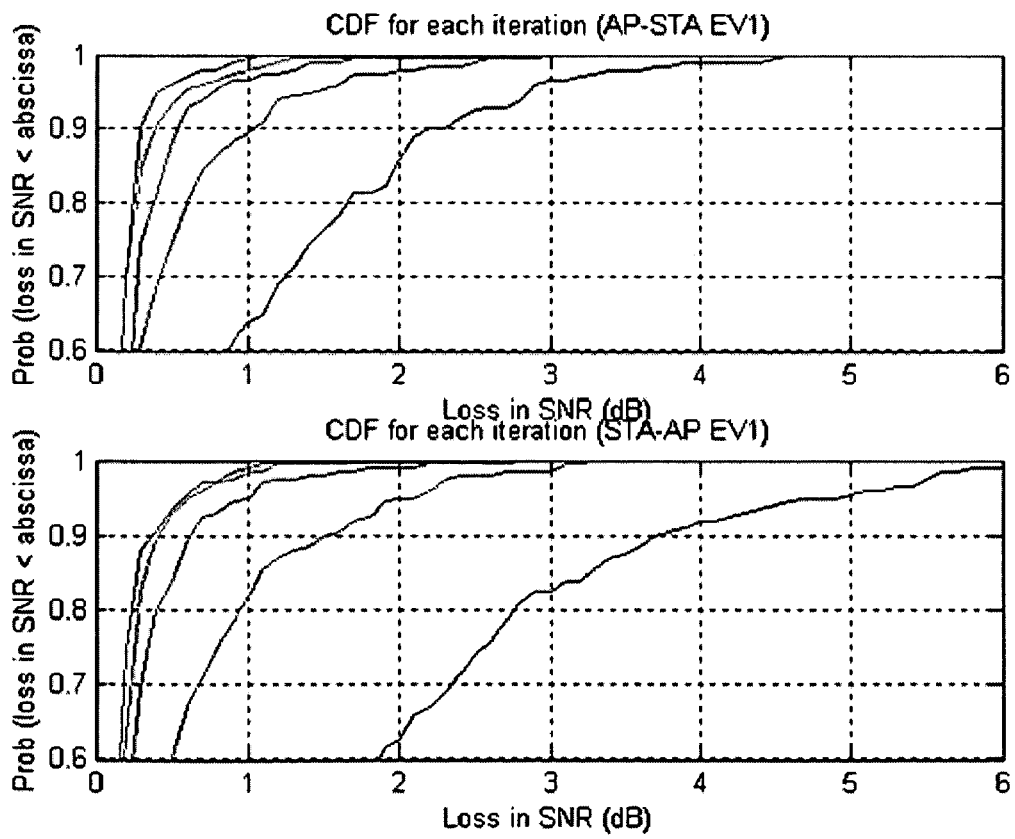
FIG. 8 is a graph showing the loss in SNR at each iteration for the first principal eigenvector.

FIG. 8 shows the performance for convergence to the first principal eigenvector (EV1). The adaptive algorithm losses are less than 1 dB at the $2^{nd}$ iteration with 95% probability, which represents the performance of the power iteration algorithm for computing the principal eigenvector.

FIG. 9 shows the performance for convergence of the $2^{nd}$ principal eigenvector (EV2). The adaptive algorithm losses are less than 1 dB after 1 iteration with 95% probability. The initial loss in SNR for the non-principal eigenmodes is smaller and the convergence is also faster. Similarly, FIG. 10 shows the performance for convergence to the $3^{rd}$ principal eigenvector (EV3). Since the power in the remaining eigenvectors is small, there is minimal loss in SNR.

The process shown in FIG. 6 achieves convergence in 2 transmit/receive iterations in a consistent channel environment. Convergence is slowest for the principal eigenvector. Furthermore, the data rate can be dynamically adjusted by estimating the SNR in each eigenmode.

Figure 11:
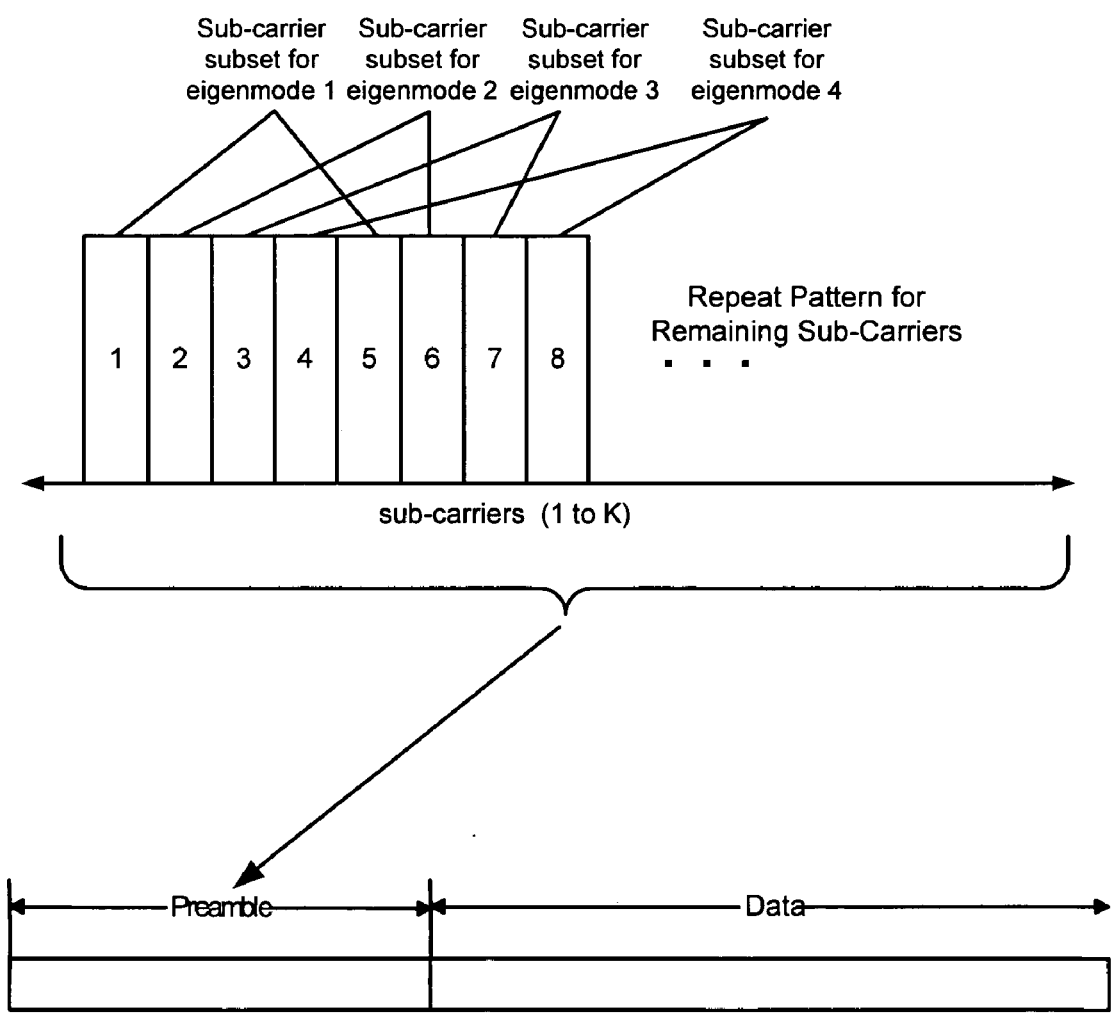
FIG. 11 is a diagram illustrating an exemplary synchronization sequence useful in connection with the adaptive algorithm shown in FIG. 6.

The preceding description of the process shown in FIG. 6 assumes that the channel state information is derived for each sub-carrier for each mode. A technique that may be used to provide channel state information for each mode is depicted in FIG. 11. According to this technique, receive weights are computed at a first device from a synchronization field (that may be contained in a preamble) transmitted by a second device each time the second device transmits to the first device. The first device computes the transmit matrix from the receive weights as explained above. Likewise, a similar sequence is included each time the first device transmits to the second device to allow the second device to synchronize and compute the receive weights, which are then used to compute the transmit matrix as explained above. Ideally, a synchronization field would include all frequency sub-carriers for each eigenmode for a multi-carrier baseband modulation scheme. However, this increases the overhead which reduces the overall throughput.

Generally, the delay spread of the channel is limited to a duration that is less than the length of the symbol. The overhead in the synchronization field can therefore be reduced by using only a subset of the frequency sub-carriers for each eigenmode, and moreover a different or unique (disjoint) subset of the frequency sub-carriers for each eigenmode. The receive weights for the remaining sub-carriers for a mode can be derived (e.g., interpolated using a variety of interpolation techniques) from the receive weights for the subset of sub-carriers for that mode. An example of allocating a unique subset of sub-carriers for each eigenmode is shown in the table below and in FIG. 11. In general, if the number of eigenmodes is L, then every Lth sub-carrier in the field may be assigned to a corresponding eigenmode ($k_1$, $k_2$, $k_3$ & $k_4$ are sub-carrier indices for eigenmodes 1, 2, 3 & 4, respectively).

| Eigenmode | Sub-Carriers |
| --- | --- |
| 1 | $k_1$ = 1, 5, 9, 13, 17, . . . |
| 2 | $k_2$ = 2, 6, 10, 14, 18, . . . |
| 3 | $k_3$ = 3, 7, 11, 15, 19, . . . |
| 4 | $k_4$ = 4, 8, 12, 16, 20, . . . |

Recall that the transmitted signal (index k is included to explicitly show the dependence on k) at each sub-carrier is represented $A(k)s(k)=W_T(k)s(k)$. The synchronization sequence, s(k), can be written as shown below, where sub-carriers $k_m$ are non-zero only for eigenmode m.

$$s(k_1) = \begin{bmatrix} c(k_1) \\ 0 \\ 0 \\ 0 \end{bmatrix}, s(k_2) = \begin{bmatrix} 0 \\ c(k_2) \\ 0 \\ 0 \end{bmatrix}, s(k_3) = \begin{bmatrix} 0 \\ 0 \\ c(k_3) \\ 0 \end{bmatrix}, \& s(k_4) = \begin{bmatrix} 0 \\ 0 \\ 0 \\ c(k_4) \end{bmatrix},$$

where $c(k_m)$ is a synchronization symbol at sub-carrier $k_m$. At a transmitting device, e.g., device 100 shown in FIG. 1, the transmit matrix of size N×L (N is the number of transmit antennas and L=4) can be written as $$W_T(k)=[w_{1,T}(k),w_{2,T}(k),w_{3,T}(k),w_{4,T}(k)],$$

where $w_{m,T}(k)$ is the N×1 vector of transmit weights for eigenmode m at sub-carrier k. Note that only a subset of transmit weight elements, $w_{m,T}(k_m)$, corresponding to sub-carriers $k_m$, is used for transmitting the synchronization sequence in eigenmode m.

At the receiving device, (e.g., device 200 shown in FIG. 1) the M×L matched filter matrix (where M is the number of receive antennas) can be written as:

$$W_{MF}(k)=[w_{1,MF}(k),w_{2,MF}(k),w_{3,MF}(k),w_{4,MF}(k)]$$

where $w_{m,MF}(k)$ is the M×1 vector of matched filter weights for eigenmode m at sub-carrier k. For the training sequence shown above, the filter coefficients can be computed for eigenmode 1 as:

$$w_{1,MF}(k_1) = \frac{y(k_1)}{s(k_1)}$$

where $y(k_1)=H(k_1)W_T(k_1)s(k_1)$ is the received signal at sub-carrier index $k_1$. The matched filter weights at other sub-carrier indices can be computed as $$w_{1,MF}(k)=F(w_{1,MF}(k_1))$$

where F(.) is an interpolation function, such as a linear interpolation function. The filter weights for the other eigenmodes can be derived in a similar manner.

This technique is most typically applied when transmitting a synchronization field, such as in a preamble, from one device to another. When transmitting a data field, the transmit matrix is usually applied for all the frequency sub-carriers for all of the eigenmodes, though it may also be useful for pilot signals that are transmitted during a data field (such as in some OFDM systems) or for other systems that may embed pilot signals with symbol fields.

To summarize, when a device transmits a synchronization field, the elements of the transmit matrix for corresponding ones of the plurality of modes are applied to the plurality of modes to be transmitted for disjoint subsets of a plurality of frequency sub-carriers associated with a multi-carrier baseband modulation scheme. Consequently, only one mode is transmitted at any frequency sub-carrier, and the channel information for each mode at all of the sub-carriers is reconstructed (interpolated) at the receive side. At the other device, the signals associated with the transmitted synchronization field (using elements of a transmit matrix for corresponding ones of the plurality of modes for disjoint subsets of a plurality of frequency sub-carriers associated with a multi-carrier modulation scheme) are received and receive weights are computed from the received signals at the plurality of antennas of the receiving device. There will be one receive weight for each frequency sub-carrier, albeit multiple receive weights for each mode, but spread across the frequency sub-carriers according to an allocation pattern such as the one shown in the table above. From these receive weights, the receive weights at each of (all) the plurality of-frequency sub-carriers for each of the plurality of modes are derived using an interpolation process. When a data field is to be transmitted from one device to another, it applies elements of the transmit matrix corresponding to each of the plurality of modes for all (each of) the plurality of sub-carriers. One method of deriving the complete set of receive weights involves interpolating (using linear interpolation or other techniques) at remaining ones of the plurality of frequency sub-carriers for each of the plurality of modes from the receive weights for the plurality of frequency sub-carriers associated with the received signals.

The inherent updating of channel state information afforded by the adaptive algorithm may be exploited to provide a technique for individually (separately) adjusting or selecting the transmit data rate for each eigenmode (signal stream) from one device to another device. Assuming channel and power reciprocity between first and second devices, the received SNR for each eigenmode at the transmit device on the link (e.g., a first device) can be used to select the transmit data rate for that eigenmode when the first device transmits to the second device. Under these assumptions, the receive SNR for each eigenmode is identical for both sides of the link. Therefore, the device on each side of the link can select the transmit data rate for each eigenmode based on the received SNR for that eigenmode. The receive SNR in each eigenmode p (for p=1 to L) may be expressed as $SNR_p = |W_{MF,p}|^2/\sigma_n^2$, where $W_{MF,p}$ is the pth column of the matched filter $W_{MF}$ at the STA or AP, and $\sigma_n^2$ is the noise power at the receiver of that device. Moreover, the transmit data rate can be dynamically updated at each iteration (each time one device receives signals from the other device) and the rate selection may be implemented to track the SNR, which should improve/converge over transmit/receive iterations between the two devices. Rate selection may be performed at the medium access control (MAC) layer and the physical (PHY) layer passes the SNR information to the MAC layer. For OFDM systems, the SNR in each sub-carrier is estimated and SNR over all sub-carriers is averaged (i.e., $SNR_p = 1/K\Sigma|W_{MF,p}(k)|^2$. The average SNR as the received SNR used to determine the data rate for each eigenmode.

In the more general case, the power reciprocity assumption may not hold and the total transmit power on both ends of the link may not necessarily be the same. Correction for the offset between the total transmit power at the two devices may need to be made in order to select the appropriate transmit data rate. One technique to share transmit power information between the devices is to exchange this information during communication link setup. Alternatively, the transmit power information can be contained in a PHY header associated with a transmission from one device to the other. A similar process would be performed in the reverse direction.

Rather than use received SNR at the transmit device for rate selection, according to another rate selection technique the received SNR information is transmitted from the receiving device to the transmitting device. For example, a first device may transmit received SNR information in an ACK message to the second device. The second device would then use the received SNR information (received SNR of each eigenmodes at the first device) to adjust the transmit data rates for each eigenmode when transmitted to the first device.

The following is an example of a transmit rate selection process given knowledge of the received SNR for each eigenmode at the destination device, obtained using one of the techniques described above. The data rate may be selected from a discrete set of possible rates, such as the data rates in the IEEE 802.11a communication standard, (e.g. 6, 9, 12, 18, 24, 36, 48, 54 Mbps), or may be based on some other relationship between SNR and data rate. In the example of the 802.11a data rates, each data rate requires a minimum SNR and it is generally desirable to select the maximum possible data rate for a given SNR. Such a SNR to data rate mapping technique could be implemented using a lookup table and associated logic.

An example is shown in the table and pseudo-code below that would be applied for each eigenmode given an SNR for each eigenmode.

Figure 12:
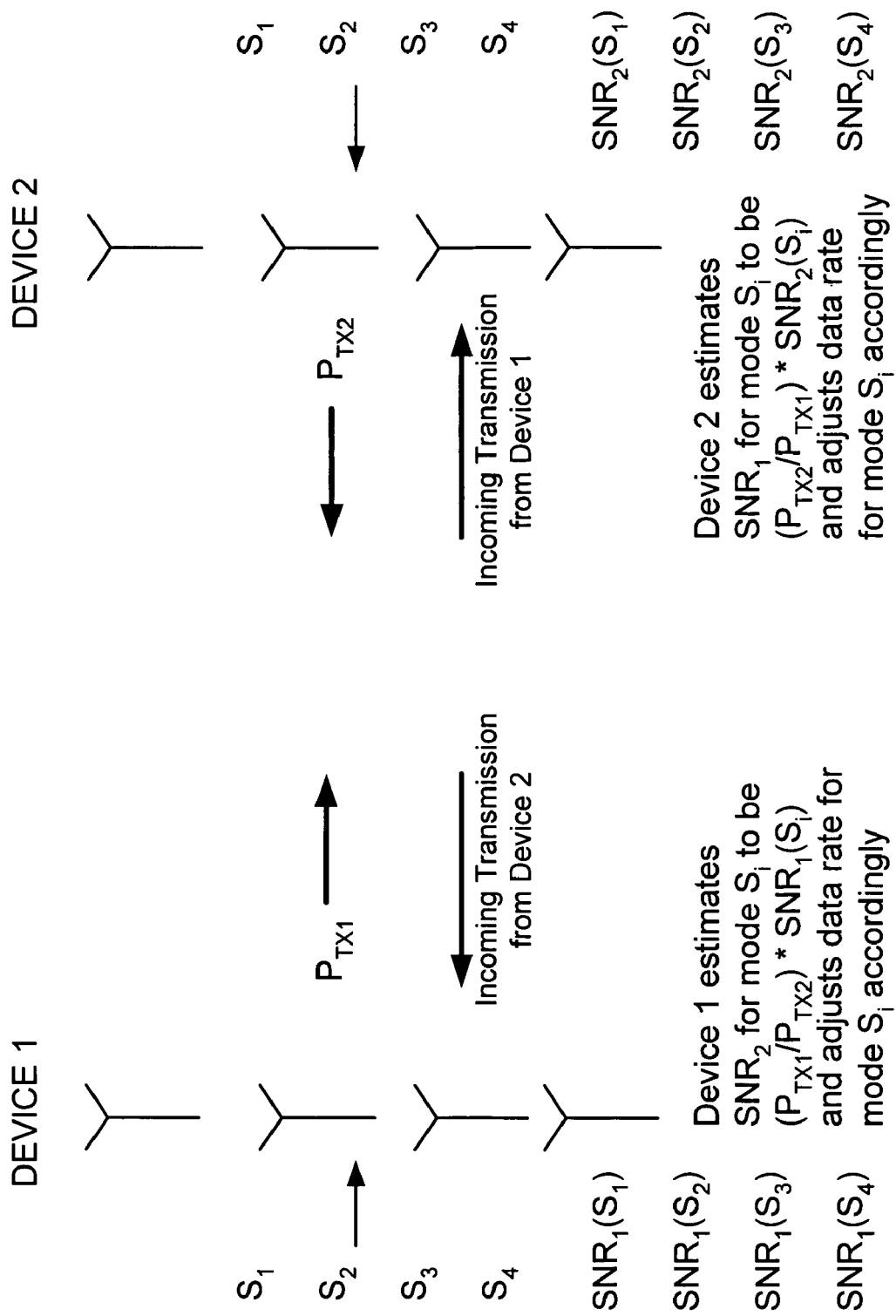
FIG. 12 is a diagram illustrating a technique for selecting the transmit data rate for individual eigenmodes when one device transmits to another device.

| Minimum SNR | Data Rate |
|---|---|
| 1 dB | 6 Mbps |
| 10 dB | 24 Mbps |
| 20 dB | 54 Mbps | if (SNR>=20) data rate=54
else if (SNR>=10) data rate=24
else if (SNR>=1) data rate=6
else data rate=0: do not transmit on this eigenmode FIG. 12 illustrates how two devices, device 1 and device 2, perform the SNR estimate and rate selection process. In this example, there are four modes (signal streams) $s_1$, $s_2$, $s_3$ and $s_4$ that each device transmits to the other. When device 1 sends a transmission to device 2 with total power $P_{TX1}$, device 2 receives the transmission and can compute its received SNR for each mode, represented as $SNR_2(s_1)$, $SNR_2(s_2)$, $SNR_2(s_3)$ and $SNR_2(s_4)$. Device 2 can then estimate the received SNR at device 1, $SNR_1$, for each mode from its received SNR, $SNR_2$, for each mode, using the mathematical relationship $SNR_1(s_i) = P_{TX2}/P_{TX1} * SNR_2(s_i)$. Knowledge of $P_{TX1}$, the total transmit power that device 1 used to send the transmission that device 2 received, is provided to device 2 using one of the techniques referred to above, or other suitable techniques. When device 2 computes the SNR at device 1 for each mode, $SNR_1(s_i)$, it can then adjust the transmit data rate for each mode when transmitting back to device 1. For example, at an iteration when device 2 computes the $SNR_1$ for mode: (1) $s_1$ to be 28 dB, device 2 will select a data rate of 54 Mbps (in the 802.11a example) for transmitting at mode $s_1$ to device 1; (2) $s_2$ to be 15 dB, device 2 will select a data rate of 24 Mbps for transmitting at mode $s_2$ to device 1; (3) $s_3$ to be 8 dB, device 2 will select a data rate of 6 Mbps for transmitting at mode $s_3$ to device 1; and (4) s4 to be 2 dB, device 2 will select a data rate of 1 Mbps for transmitting at mode $s_4$ to device 1.

A similar process occurs in the reverse direction when device 1 receives a transmission from device 2. Device 1 computes the received SNR for each mode, $SNR_1(s_i)$. Device 1 then estimates the received SNR at device 2, $SNR_2(s_i)$, from $SNR_1(s_i)$ using the mathematical relationship $SNR_2(s_i)=P_{TX1}/P_{TX2}*SNR_1(s_i)$, where knowledge of the total power transmitted by device 2, $P_{TX2}$, for the transmission is provided to device 1 according to the aforementioned or other techniques. Device 1 then selects the transmit data rate for each mode when transmitting back to device 2 similar to the rate selection process described above at device 2.

This process may continue so that device 1 and device 2 can dynamically select or adjust (update) the transmit data rates for each individual eigenmode when transmitting to the other device according to changing conditions in the channel between the two devices. Obviously, it can be seen from the mathematical relationships described above that if the power transmitted by device 1 is the same as the power transmitted by device 2, then $P_{TX1}/P_{TX2}=1$, such that $SNR_2(s_i)=SNR_1(s_i)$. Information indicating the transmit power of each device can also be updated (in a PHY header or other message) for each transmission.

To summarize, each device on the link can select a transmit data rate separately for each of a plurality of modes to be transmitted to the other device. The step of selecting is performed according to a received SNR at the other device for each of the plurality of modes. The transmitting device estimates the received SNR at the other device for each of the plurality of modes from the received SNR at the transmitting device for each of the plurality of modes. The step of estimating may comprise equating the received SNR for each mode at the other device to the received SNR of the corresponding mode at the transmitting device, but in the case where there is not power reciprocity between the two devices, then a factor that compensates for a difference between the transmit power at the respective devices may be applied to (multiplied by) the received SNR of the corresponding mode at the transmitting device. The transmitting device may receive information from the other device that indicates the transmit power used by the other device, and that information is used to determine a value for the power compensation factor (e.g., $P_{TX1}/P_{TX2}$ or $P_{TX2}/P_{TX1}$. When selecting a transmit data rate for each mode, the transmitting device may select a slower transmit data rate for lower received SNR of a mode and select a higher data rate for higher received SNR of a mode. Rather than derive the received SNR for each mode at the other device, the transmitting device may receive information (SNR feedback) sent by the other device that indicates the receive SNR for each mode at the other device. Rate selection for each mode may be updated or performed at the transmitting device each time a transmission is received at the transmitting device from the other device. These rate selection techniques may be performed at both devices on the link.

The techniques described above may be embodied in a radio communication device comprising a plurality of antennas; a radio transceiver coupled to the plurality of antennas, the radio transceiver capable of upconverting a plurality of transmit signals for simultaneous transmission via the plurality of antennas, and downconverting a plurality of signals simultaneously received at the plurality of antennas to produce a plurality of received signals; and a baseband signal processor coupled to the radio transceiver that computes a transmit matrix from parameters derived from the plurality of received signals representing a plurality of modes simultaneously transmitted by another communication device, wherein each mode is a signal stream, wherein the transmit matrix distributes a plurality of modes among a plurality of antenna paths associated with corresponding ones of the plurality of antennas, and the baseband signal processor applies the transmit matrix to the plurality of modes to produce the plurality of transmit signals to be simultaneously transmitted to the other communication device. Moreover, a system may be provided comprising first and second communication devices (configured as described above) that communicate with each other.

Similarly, these techniques may be embodied as instructions encoded on a medium that, when executed, perform steps of computing a matched filter matrix from a plurality of received signals representing a plurality of modes simultaneously transmitted by a second communication device at received at a plurality of antennas of first communication device, wherein each mode is a data signal stream; computing from the matched filter matrix a transmit matrix to distribute a plurality of modes among a plurality of antenna paths associated with corresponding ones of the plurality of antennas of the first communication device; and applying the transmit matrix to the plurality of modes to be simultaneously transmitted from the plurality of antennas of the first communication device to the second communication device. The medium may be a processor readable medium, such as a memory (included as part of the control processor 160 in FIG. 3), that stores processor (computer) readable instructions (software) that when executed by the processor, cause the processor to perform these and other steps described herein. Alternatively, the medium may be a semiconductor on which a plurality of digital logics gates are deployed and configured to perform these and other steps described herein (perhaps as part of the modem 120 shown in FIG. 3). For example, the semiconductor may be an application specific integrated circuit that is the baseband signal processor or modem. These instructions may also be implemented by a field programmable gate array.

Said still another way, a method is provided for simultaneously communicating a plurality of signals between a first communication device and a second communication device, comprising steps of: (a) applying a transmit matrix to a plurality of baseband signals to be transmitted from the first communication device to the second communication device, the transmit matrix distributing the plurality of baseband signals among a plurality of antennas of the first communication device for simultaneous transmission to the second communication device; (b) receiving the signals transmitted by the first communication device at a plurality of antennas of the second communication device to compute a matched filter matrix from the received signals; (c) computing from the matched filter matrix a transmit matrix for transmitting a plurality of baseband signals from the second communication device to the first communication device, the transmit matrix distributing the plurality of baseband signals among the plurality of antennas of the second communication device; and (d) applying the transmit matrix to the plurality of baseband signal to be transmitted from the second communication device to the first communication device. Similarly, when the second communication transmits back to the first communication device, the first communication device updates the transmit matrix at the first communication device from a matched filter matrix derived from the signals received from the second communication device. At the first and second communication devices, the transmit matrix is computed by computing the orthogonalization of the matched filter matrix derived from the signals received at that device.

Viewed from the perspective at a device on one side of the link, a method for radio communication between a first communication device and a second communication device, comprising: computing a transmit matrix from signals received at a plurality of antennas of the first communication device, wherein the signals represent a plurality of modes simultaneously transmitted by the second communication device to the first communication device, wherein each mode is a signal stream, and wherein the transmit matrix distributes a plurality of modes among a plurality of antenna paths associated with corresponding ones of the plurality of antennas of the first communication device; and applying the transmit matrix to the plurality of modes to be simultaneously transmitted from the plurality of antennas of the first communication device to the second communication device.

The above description is intended by way of example only.

What is claimed is:

1. A method for radio communication between a first communication device and a second communication device, comprising:
   a. at the first communication device, receiving, at a plurality of antennas of the first communication device, signals representing a plurality of modes that are simultaneously transmitted by the second communication device to the first communication device, wherein each mode is a signal stream;
   b. at the first communication device, computing receive weights from the signals received at the plurality of antennas of the first communication device that were transmitted by the second communication device, such that the receive weights are computed without receiving a separate training sequence;
   c. at the first communication device, computing a transmit matrix from the receive weights, and
   d. at the first communication device, applying the transmit matrix to the a plurality of modes to be simultaneously transmitted from the plurality of antennas of the first communication device to the second communication device.

2. The method of claim 1, wherein at the first communication device, further comprising computing a matched filter matrix from the signals received from the second communication device at the plurality of antennas of the first communication device.

3. The method of claim 2, wherein at the first communication device computing the transmit matrix comprises computing the orthogonalization of the matched filter matrix.

4. The method of claim 1, wherein computing and applying at the first communication device are performed each time signals are received from the second communication device to update the transmit matrix that the first communication device uses to transmit a plurality of modes to the second device.

5. The method of claim 1, wherein the steps of computing and applying at the first communication device are performed at baseband for each of a plurality of frequency sub-carriers associated with a multi-carrier modulation scheme used for each of the plurality of modes.

6. The method of claim 5, wherein at the first communication device, computing comprises computing the transmit matrix such that the power transmitted from each of the plurality of antennas of the first communication device is less than a maximum power.

7. The method of claim 6, wherein at the first communication device, computing comprises computing the transmit matrix such that the sum of the power at corresponding sub-carrier frequencies for each mode across the plurality of antenna paths of the first communication device is the same.

8. The method of claim 1, wherein at the first communication device and further comprising selecting a transmit data rate separately for each of the plurality of modes to be transmitted from the first communication device to the second communication device.

9. The method of claim 8, wherein at the first communication device selecting is performed according to a received signal-to-noise ratio (SNR) for each of the plurality of modes at the second communication device.

10. The method of claim 9, wherein at the first communication device further comprising estimating the received SNR for each of the plurality of modes transmitted by the first communication device and received at the second communication device from the received SNR for associated with each of the plurality of modes received at the first communication device that are transmitted by the second communication device.

11. The method of claim 10, wherein at the first communication device estimating comprises equating the received SNR for each of the plurality of modes at the second communication device to the received SNR of a the corresponding mode received at the first communication device.

12. The method of claim 10, wherein at the first communication device estimating the received SNR for each of the plurality of modes at the second communication device comprises multiplying the received SNR of the corresponding mode received at the first communication device by a factor that compensates for a difference between a transmit power of the first communication device and a transmit power of the second communication device.

13. The method of claim 12, wherein at the first communication device further comprising receiving from the second communication device information indicating the transmit power used by the second communication device.

14. The method of claim 9, wherein at the first communication device further comprising storing the received SNR for each of the plurality of modes received at respective ones of a plurality of other communication devices for use in rate selection when the first communication device transmits to a respective one of the plurality of other communication devices.

15. The method of claim 8, wherein at the first communication device selecting comprises selecting a slower transmit data rate when transmitting to the second communication device for lower received SNR of a mode at the second communication device and selecting a higher data rate for higher received SNR of a mode at the second communication device.

16. The method of claim 8, wherein at the first communication device selecting is performed based on received SNR information obtained each time a transmission is received at the first communication device from the second communication device.

17. The method of claim 16, wherein at the first communication device further comprising receiving from the second communication device information indicating the received SNR for each of the plurality of modes received at the second communication device that are transmitted by the first communication device.

18. The method of claim 1, wherein for a synchronization field that the first communication device transmits to the second communication device, applying comprises applying elements of the transmit matrix for corresponding ones of the plurality of modes for disjoint subsets of a plurality of frequency sub-carriers associated with a multi-carrier baseband modulation scheme.

19. The method of claim 18, wherein for a data field that the first communication device transmits to the second communication device applying comprises applying elements of the transmit matrix corresponding to each of the plurality of modes for all the plurality of sub-carriers associated with a baseband modulation scheme.

20. The method of claim 1, wherein at the first communication device computing receive weights comprises computing receive weights at a plurality of frequency sub-carriers associated with a multi-carrier baseband modulation scheme from signals transmitted by the second communication device and received at the plurality of antennas of the first communication device representing a synchronization field transmitted by the second communication device using elements of a transmit matrix for corresponding ones of the plurality of modes for disjoint subsets of a plurality of frequency sub-carriers associated with a multi-carrier baseband modulation scheme.

21. The method of claim 20, wherein at the first communication device deriving computing the receive weights comprises interpolating the receive weights at remaining ones of the plurality of frequency sub-carriers for each of the plurality of modes from the receive weights for the plurality of frequency sub-carriers associated with the received signals.

22. A radio communication device comprising:
  a. a plurality of antennas;
  b. a radio transceiver coupled to the plurality of antennas, the radio transceiver upconverting a plurality of transmit signals for simultaneous transmission via the plurality of antennas, and downconverting a plurality of signals simultaneously received at the plurality of antennas to produce a plurality of received signals; and
  c. a baseband signal processor coupled to the radio transceiver that: (i) computes receive weights from signals representing a plurality of modes transmitted by another communication device and received at the plurality of antennas, wherein each mode is a signal stream and such that the receive weights are derived without receiving a separate training sepuence; (ii) computes a transmit matrix from the receive weights; (iii) applies the transmit matrix to the plurality of modes producing a plurality of transmit signals to be simultaneously transmitted by the radio transceiver via the plurality of antennas to the other communication device.

23. The radio communication device of claim 22, wherein the baseband signal processor computes a matched filter matrix from the signals received at the plurality of antennas.

24. The radio communication device of claim 23, wherein the baseband signal processor computes the transmit matrix by computing the orthogonalization of the matched filter matrix.

25. The radio communication device of claim 22, wherein the baseband signal processor computes the transmit matrix each time a plurality of signals are received at the plurality of antennas from the other communication device.

26. The radio communication device of claim 22, wherein the baseband signal processor computes the transmit matrix for each of a plurality of frequency sub-carriers associated with a multi-carrier modulation scheme used for each of the plurality of modes.

27. The radio communication device of claim 26, wherein the baseband signal processor computes the transmit matrix such that the power transmitted from each of the plurality of antennas is less than a maximum power.

28. The radio communication device of claim 27, wherein the baseband signal processor computes the transmit matrix such that the sum of the power at corresponding sub-carrier frequencies of each mode across the plurality of antenna paths is the same.

29. The radio communication device of claim 22, wherein the baseband signal processor selects a transmit data rate separately for each of the plurality of modes to be transmitted to the other communication device.

30. The radio communication device of claim 29, wherein the baseband signal processor selects a transmit data rate according to a received signal-to-noise ratio (SNR) for each of the plurality of modes received at the other communication device.

31. The radio communication device of claim 30, wherein the baseband signal processor estimates the received SNR for each of the plurality of modes at the other communication device from the received SNR for corresponding ones of the plurality of modes received from the other communication device.

32. The radio communication device of claim 31, wherein the baseband signal processor estimates the received SNR for each of the plurality of modes at the other communication device by multiplying the received SNR of the corresponding mode by a factor that compensates for a difference between a transmit power of the communication device and a transmit power of the other communication device.

33. The radio communication device of claim 32, wherein the baseband signal processor computes the factor based on information received from the other communication device that indicates the transmit power used by the other communication device.

34. The radio communication device of claim 30, wherein the baseband signal processor estimates the received SNR for each of the plurality of modes at the other communication by equating the received SNR for each of the plurality of modes at the other communication device to the received SNR of the corresponding mode received from the other communication device.

35. The radio communication device of claim 30, wherein when transmitting to the other communication device, the baseband signal processor selects a slower transmit data rate for lower received SNR of a corresponding mode and selects a higher data rate for higher received SNR of a corresponding mode.

36. The radio communication device of claim 30, wherein the baseband signal processor selects a transmit data rate for a mode based on received SNR information obtained each time a transmission is received from the other communication device.

37. The radio communication device of claim 30, wherein the baseband signal processor processes information received from the other communication device indicating the received SNR for each of the plurality of modes received at the other communication device.

38. The radio communication device of claim 30, and further comprising a memory that stores the received SNR for each of the plurality of modes received at respective ones of a plurality of other communication devices for use in rate selection when transmitting to a respective one of the plurality of other communication devices.

39. The radio communication device of claim 22, wherein when processing a synchronization field to be transmitted to the other communication device, the baseband signal processor applies elements of the transmit matrix for corresponding ones of the plurality of modes for disjoint subsets of a plurality of frequency sub-carriers associated with a multi-carrier baseband modulation scheme.

40. The radio communication device of claim 39, wherein when processing a data field to be transmitted to the other communication device, the baseband signal processor applies elements of the transmit matrix corresponding to each of the plurality of modes for all the plurality of sub-carriers associated with a baseband modulation scheme.

41. The radio communication device of claim 22, wherein the baseband signal processor computes receive weights at the plurality of frequency sub-carriers associated with a multi-carrier baseband modulation scheme from signals received at the plurality of antennas representing a synchronization field transmitted by the other communication device using elements of a transmit matrix for corresponding ones of the plurality of modes for disjoint subsets of a plurality of frequency sub-carriers associated with a multi-carrier baseband modulation scheme, and derives therefrom receive weights at each of the plurality of frequency sub-carriers for each of the plurality of modes.

42. The radio communication device of claim 41, wherein the baseband signal processor derives the receive weights at each of the plurality of frequency sub-carriers for each of the plurality of modes by interpolating the receive weights at remaining ones of the plurality of frequency sub-carriers for each of the plurality of modes from the receive weights for the plurality of frequency sub-carriers associated with the received signals.

43. A medium encoded with instructions that when executed, perform a method comprising the steps of:
 a. computing a transmit matrix from receive weights derived from a plurality of signals representing a plurality of modes simultaneously transmitted by a second communication device and received at a plurality of antennas of a first communication device, wherein each mode is a signal stream and such that the receive weights are derived without receiving a separate training sequence; and
 b. applying the transmit matrix to the plurality of modes to be simultaneously transmitted from the plurality of antennas of the first communication device to the second communication device.

44. A method for radio communication between a first communication device and a second communication device using radio frequency (RF) communication techniques, comprising:
 a. at the first communication device:
  i. receiving at a plurality of antennas signals representing a plurality of modes simultaneously transmitted by the second communication device, wherein each mode is a signal stream;
  ii. computing a transmit matrix from parameters derived from the signals received at the plurality of antennas, said parameters derived without receiving a separate training seauence; and
  iii. applying the transmit matrix to the plurality of modes to be simultaneously transmitted from the plurality of antennas of the first communication device to the second communication device;
 b. at the second communication device:
  i. receiving at a plurality of antennas signals representing a plurality of modes simultaneously transmitted by the first communication device;
  ii. computing a transmit matrix from parameters derived from the signals received at the plurality of antennas, said parameters derived without receiving a separate training sequence; and
  iii. applying the transmit matrix to the plurality of modes to be simultaneously transmitted from the plurality of antennas of the second communication device to the first communication device;
 c. wherein the step of computing the transmit matrix is repeated each time signals are received at the first communication device from the second communication device to update the transmit matrix at the first communication device, and the step of computing the transmit matrix is repeated each time signals are received at the second communication device from the first communication device to update the transmit matrix at the second communication device.

45. A radio communication system comprising first and second communication devices, wherein
 a. the first communication device comprises:
  i. a plurality of antennas;
  ii. a radio transceiver coupled to the plurality of antennas, the radio transceiver capable of upconverting a plurality of transmit signals for simultaneous transmission via the plurality of antennas, and downconverting a plurality of signals simultaneously received at the plurality of antennas to produce a plurality of received signals; and
  iii. a baseband signal processor coupled to radio transceiver that computes a transmit matrix from parameters derived from the plurality of received signals representing a plurality of modes simultaneously transmitted by the second communication device, wherein each mode is a signal stream, said parameters are derived without receiving a separate training sequence, and the baseband signal processor applies the transmit matrix to the plurality of modes to produce the plurality of transmit signals to be simultaneously transmitted to the second communication device;
 b. wherein the second communication device comprises:
  i. a plurality of antennas;
  ii. a radio transceiver coupled to the plurality of antennas, the radio transceiver capable of upconverting a plurality of transmit signals for simultaneous transmission via the plurality of antennas, and downconverting a plurality of signals simultaneously received at the plurality of antennas to produce a plurality of received signals; and
  iii. a baseband signal processor coupled to radio transceiver that computes a transmit matrix from parameters derived from the plurality of received signals representing a plurality of modes simultaneously transmitted by the first communication device, such that the derived parameters are derived without receiving a separate training sequence, and the baseband signal processor applies the transmit matrix to the plurality of modes to produce the plurality of transmit signals to be simultaneously transmitted to the first communication device;
 c. wherein the baseband signal processors at the first and second communication devices compute their respective transmit matrix each time signals are received from the other communication device.

46. A method for simultaneously communicating a plurality of signals between a first communication device and a second communication device using radio frequency (RF) communication techniques, comprising:
 a. applying a transmit matrix to a plurality of baseband signals to be simultaneously transmitted from the first communication device via a plurality of antennas of the first communication device to the second communication device;

b. receiving the signals transmitted by the first communication device at a plurality of antennas of the second communication device to compute a matched filter matrix from the received signals, said matched filter matrix computed without receiving a separate training sequence;

c. computing from the matched filter matrix a transmit matrix for simultaneously transmitting a plurality of baseband signals from the second communication device to the first communication device; and d. applying the transmit matrix to the plurality of baseband signal to be transmitted from the second communication device to the first communication device.

47. The method of claim 46, wherein the step of computing the transmit matrix at the second communication device comprises computing the orthogonalization of the matched filter matrix.

48. The method of claim 47, and further comprising steps of e. receiving at the first communication the plurality of signals transmitted by the second communication device and computing a matched filter matrix therefrom;

f. updating the transmit matrix at the first communication device from the matched filter matrix derived from the signals received from the second communication device.

49. The method of claim 48, wherein the step of updating the transmit matrix at the first communication device comprises computing the orthogonalization of the matched filter matrix of the first communication device.

50. The method of claim 48, wherein steps (a), (c), (d) and (f) are performed at each of a plurality of frequency sub-carriers associated with a multi-carrier modulation scheme used for each of the plurality of baseband signals transmitted between the first and second communication devices.

51. The method of claim 50, wherein the step (c) of computing the transmit matrix at the second communication device further comprises normalizing the transmit matrix such that the power transmitted from each of the plurality of antennas of the second communication device is less than a maximum power.

52. The method of claim 50, wherein the step (c) of computing the transmit matrix comprises computing values for the transmit matrix such at each frequency sub-carrier, the sum of the power of the baseband signals across all of the antennas of the second communication device is equal to a constant.

53. The method of claim 52, wherein the step (f) of computing the transmit matrix at the first communication device further comprises normalizing the transmit matrix such that the power transmitted from each of the plurality of antennas of the first communication device is less than a maximum power.

54. The method of claim 53, wherein the step (f) of computing the transmit matrix comprises computing values for the transmit matrix such at each frequency sub-carrier, the sum of the power of the baseband signals across all of the antennas of the first communication device is equal to a constant.

* * * * *